United States Patent
Kumagai et al.

(10) Patent No.: US 6,757,227 B2
(45) Date of Patent: Jun. 29, 2004

(54) OPTICAL DRIVE APPARATUS FOR USE WITH DIFFERENT RECORDING MEDIA, TRACKING CONTROL METHOD FOR USE THEREIN, AND OPTICAL DISC

(75) Inventors: Eiji Kumagai, Shinagawa-Ku (JP); Kenji Nagashima, Shinagawa-Ku (JP); Toshio Morizumi, Shinagawa-Ku (JP)

(73) Assignee: Sony Corporation, Tokyo (JP)

( * ) Notice: Subject to any disclaimer, the term of this patent is extended or adjusted under 35 U.S.C. 154(b) by 342 days.

(21) Appl. No.: 09/802,134

(22) Filed: Mar. 9, 2001

(65) Prior Publication Data

US 2002/0009024 A1 Jan. 24, 2002

(30) Foreign Application Priority Data

Mar. 10, 2000 (JP) .......................................... 2000-072517
Sep. 13, 2000 (JP) .......................................... 2000-278770

(51) Int. Cl.[7] ................................................ G11B 7/12
(52) U.S. Cl. ................................ 369/44.37; 369/44.29; 369/44.41; 369/116
(58) Field of Search ........................... 369/44.29, 44.37, 369/44.41, 116

(56) References Cited

U.S. PATENT DOCUMENTS

| | | | | |
|---|---|---|---|---|
| 5,345,435 A | * | 9/1994 | Yamasaki ................. | 369/275.3 |
| 5,373,498 A | * | 12/1994 | Tagiri ....................... | 369/275.3 |
| 5,717,674 A | * | 2/1998 | Mori et al. ................ | 369/103 |
| 5,878,022 A | * | 3/1999 | Okada et al. ............. | 369/275.4 |
| 5,883,878 A | * | 3/1999 | Satoh et al. .............. | 369/275.1 |
| 5,886,964 A | * | 3/1999 | Fujita ....................... | 369/44.37 |
| 5,886,969 A | * | 3/1999 | Maeda et al. ............. | 369/100 |
| 5,886,973 A | * | 3/1999 | Iida .......................... | 369/116 |
| 5,959,961 A | * | 9/1999 | Matsui ..................... | 369/275.1 |
| 5,986,996 A | * | 11/1999 | Kitamura et al. .......... | 369/116 |
| 6,222,803 B1 | * | 4/2001 | Uemura et al. .......... | 369/44.29 |
| 6,236,633 B1 | * | 5/2001 | Chang et al. ............. | 369/112 |
| 6,243,354 B1 | * | 6/2001 | Terasaki et al. .......... | 369/275.4 |
| 6,262,966 B1 | * | 7/2001 | Tsuchiya .................. | 369/275.4 |
| 6,333,913 B1 | * | 12/2001 | Yoshinari et al. .......... | 369/283 |
| 6,385,158 B1 | * | 5/2002 | Takagi et al. ........... | 369/112.16 |
| 6,437,947 B1 | * | 8/2002 | Uno ....................... | 360/278.04 |
| 6,507,557 B1 | * | 1/2003 | Ohno et al. .............. | 369/275.3 |
| 6,552,990 B1 | * | 4/2003 | Kajiyama et al. ....... | 369/112.06 |

* cited by examiner

Primary Examiner—Gautam R. Patel
(74) Attorney, Agent, or Firm—Oblon, Spivak, McClelland, Maier & Neustadt, P.C.

(57) ABSTRACT

An optical recording/reproducing apparatus having drive means for rotating a recording medium, an optical head for applying light to the recording medium being rotated by the drive means, thereby to record data signals on the recording medium or reproducing data from the recording medium, and a signal-processing circuit for processing a signal detected by the optical head. The optical head comprises a light source for emitting light, an objective lens, and signal detecting means. The objective lens has a numerical aperture NA, where 0.5<NA≦0.6. The apparatus can reliably record data on and reproduce data from high-density optical recording media that have different track pitches.

26 Claims, 17 Drawing Sheets

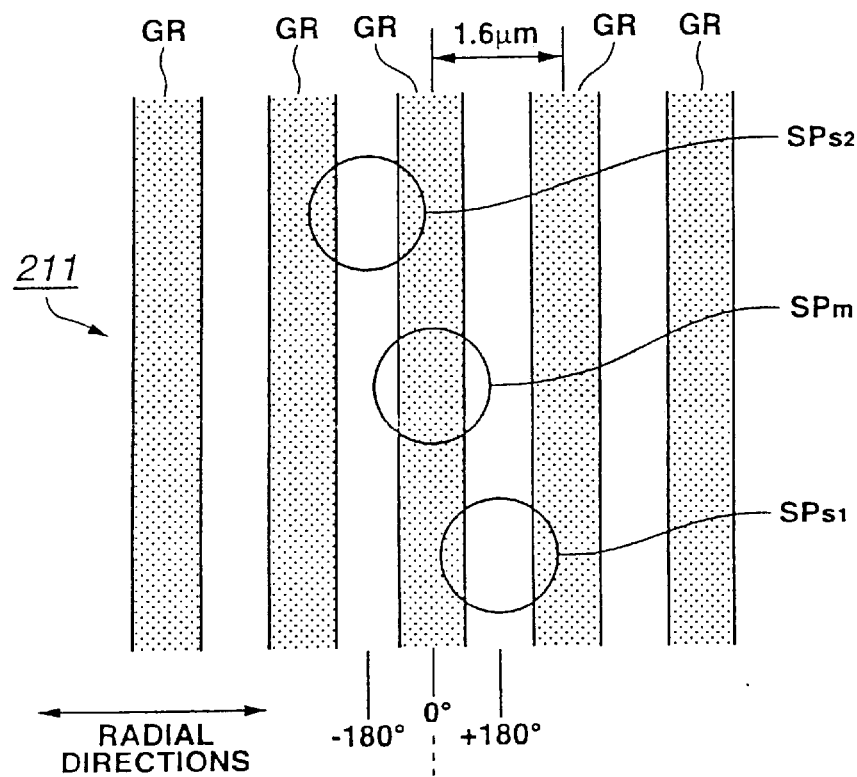
FIG.5A PRIOR ART
FIG.5B (S_ppm) PRIOR ART
FIG.5C (S_pps1) PRIOR ART
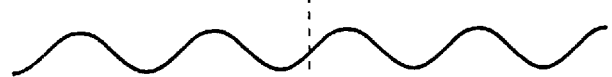
FIG.5D (S_pps2) PRIOR ART
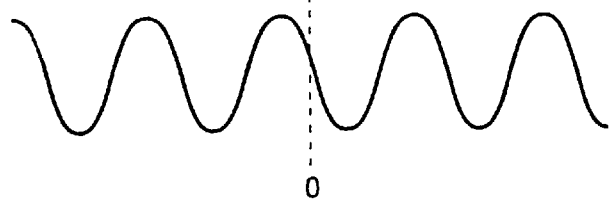
FIG.5E (S_TE) PRIOR ART

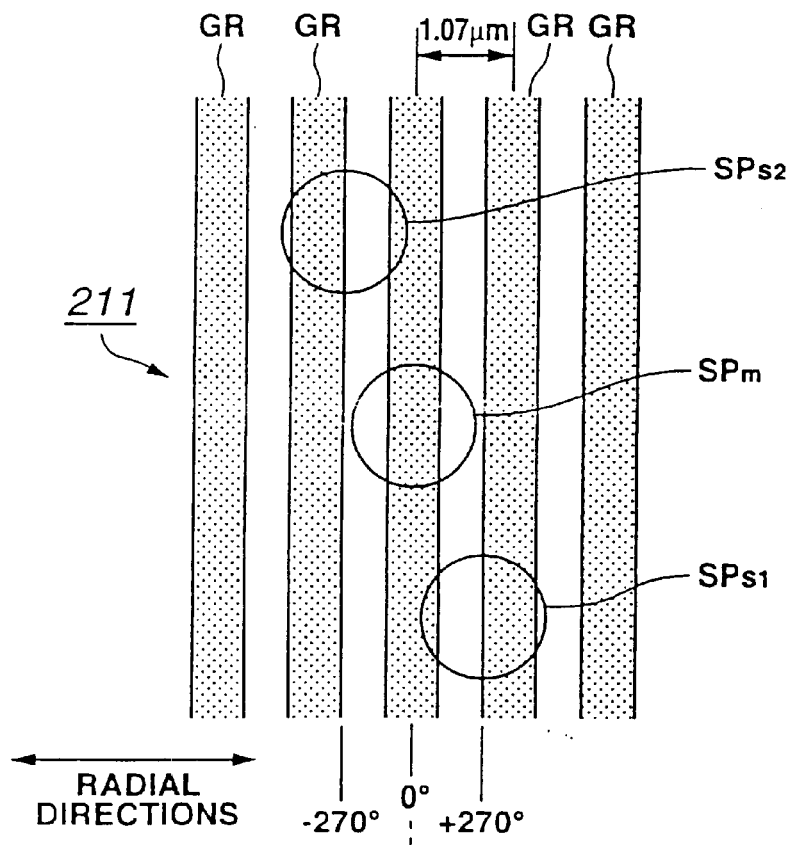
FIG.6A
PRIOR ART
FIG.6B (S_ppm)
PRIOR ART
FIG.6C (S_pps1)
PRIOR ART
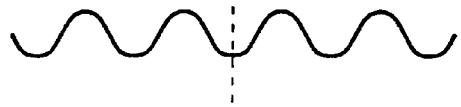
FIG.6D (S_pps2)
PRIOR ART
FIG.6E (S_TE)
PRIOR ART
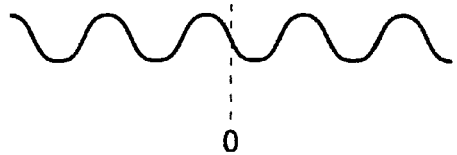

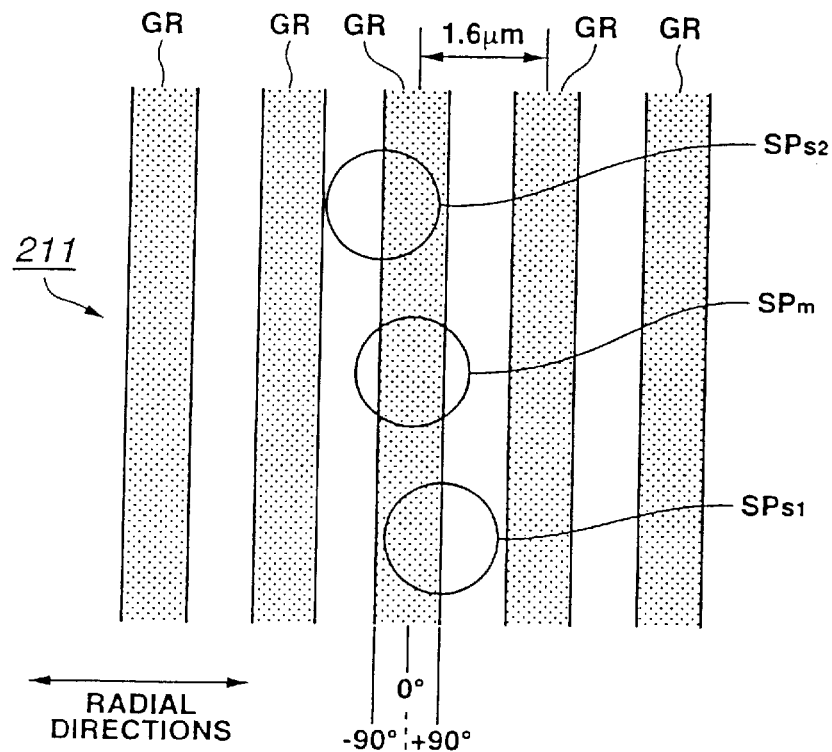
FIG. 7A PRIOR ART
FIG. 7B (Sm) PRIOR ART
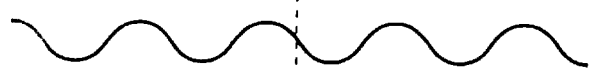
FIG. 7C (Se) PRIOR ART
FIG. 7D (St) PRIOR ART
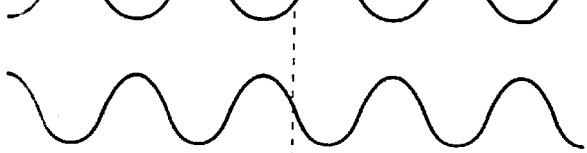
FIG. 7E (STE) PRIOR ART

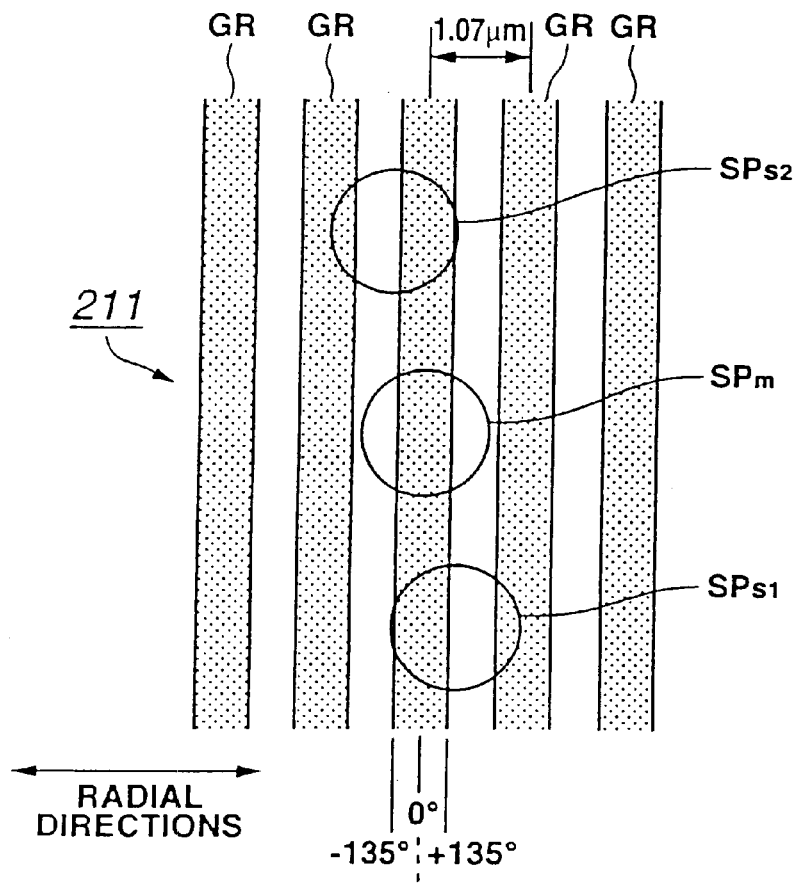
FIG. 8A PRIOR ART
FIG. 8B (Sm) PRIOR ART
FIG. 8C (Se) PRIOR ART
FIG. 8D (St) PRIOR ART
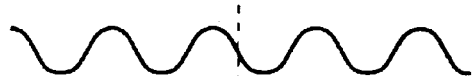
FIG. 8E (STE) PRIOR ART

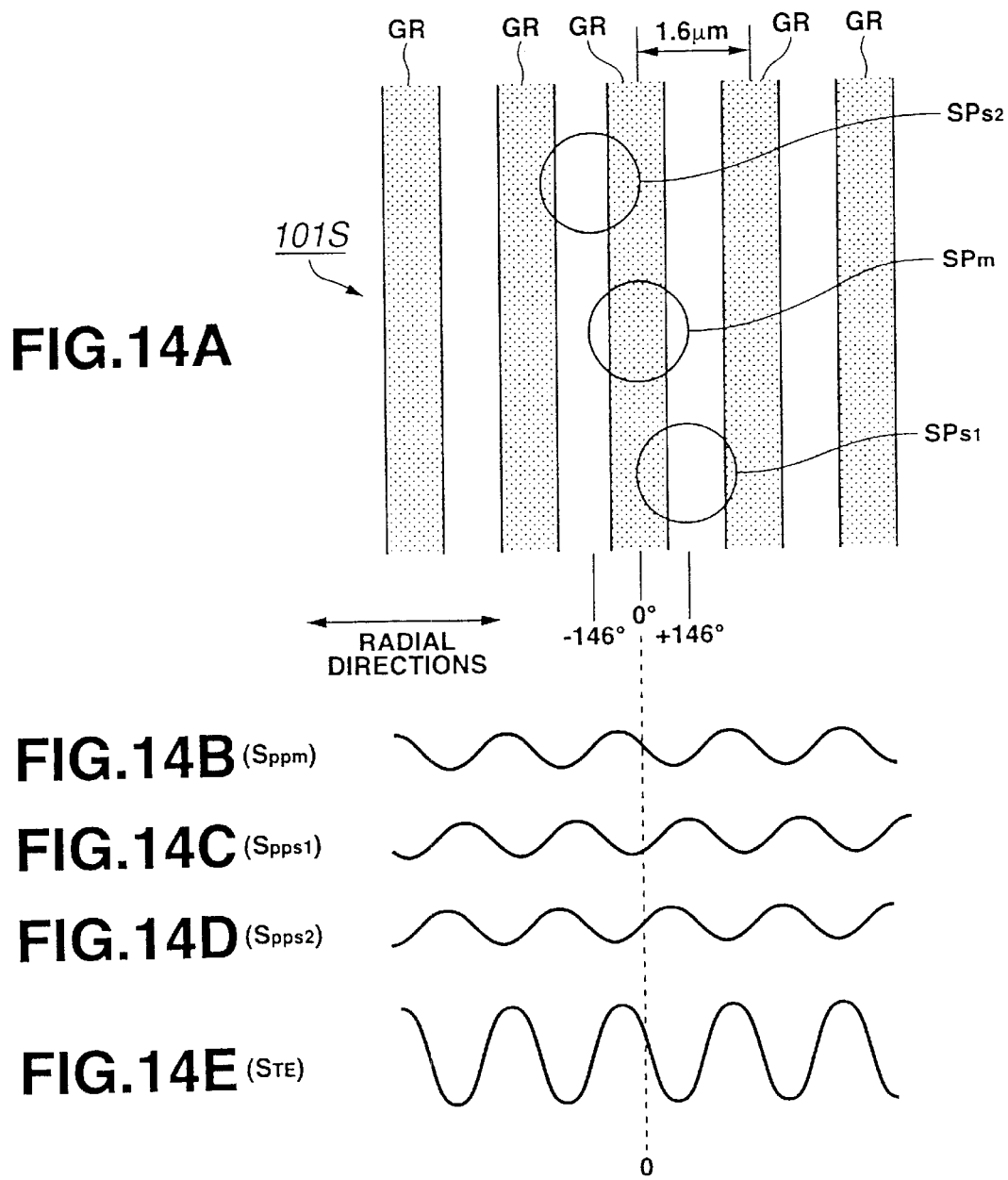

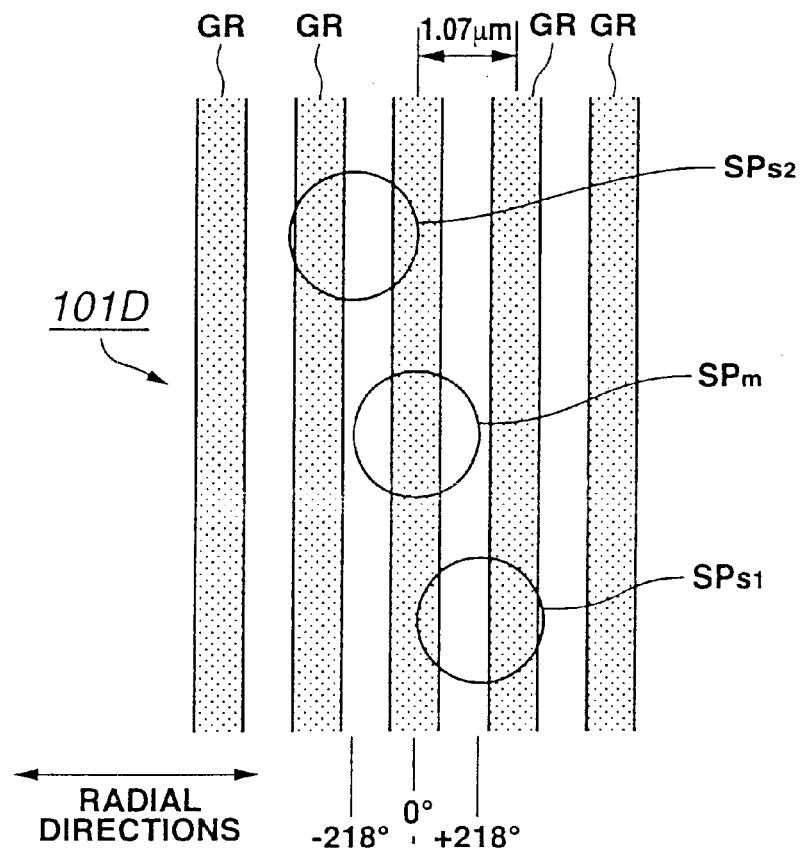
FIG.15A
FIG.15B (S_ppm) 
FIG.15C (S_pps1) 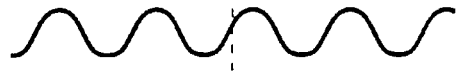
FIG.15D (S_pps2) 
FIG.15E (S_TE) 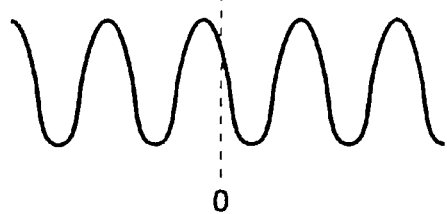

FIG.17E (STE)

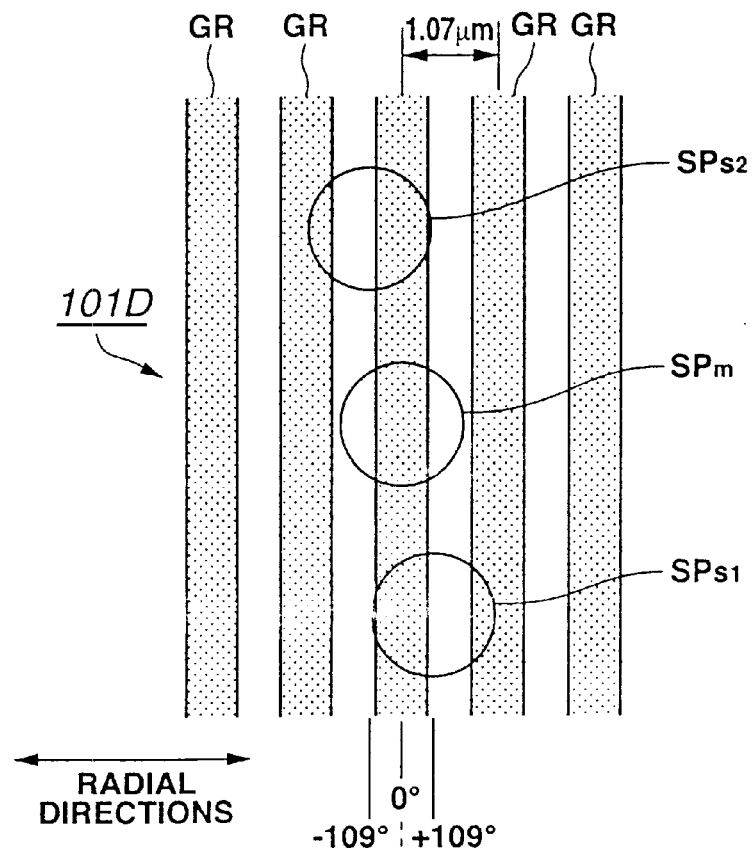
FIG.18A
FIG.18B (Sm) 
FIG.18C (Se) 
FIG.18D (Sf) 
FIG.18E (STE) 

OPTICAL DRIVE APPARATUS FOR USE WITH DIFFERENT RECORDING MEDIA, TRACKING CONTROL METHOD FOR USE THEREIN, AND OPTICAL DISC

BACKGROUND OF THE INVENTION

The present invention relates to an optical recording/reproducing apparatus comprising an optical head for applying a laser beam to an optical recording medium, thereby to record data on and reproduce data from the optical recording medium. More particularly, the present invention relates to an optical recording/reproducing apparatus for use in combination with a plurality of optical recording media, each having recording tracks formed at a track pitch different from the track pitch of any one of the other optical recording media, or with an optical recording medium that have a plurality of recording regions, each having recording tracks formed at a track pitch different from the track pitch of any one of the other recording regions.

Data recording media, such as playback-only optical discs, phase-change optical discs, magneto-optical discs and optical cards, are widely used to store video data, audio data and other data such as computer programs. In recent years it has been increasingly demanded that these data recording media should record data at higher densities and in greater amounts.

In recent years, compact discs (CDs), recordable compact discs (CD-Rs) and rewritable compact discs (CD-RWs) have come into use as means for recording data in computers. Hence, CD-R/RW apparatuses for recording data signals on, and reproducing them from, these optical recording media are used in increasing numbers.

It is increasingly required that a great amount of data, such as image data, be stored. It is therefore desirable to increase the recording capacity of optical recording media such as CD-Rs and CD-RWs.

As is known in the art, tracking error signals are generated by DPP (Differential Push Pull) method or three-spot method in the optical disc recording/reproducing apparatus for use in combination with optical discs such as CD-Rs and CD-RWs.

FIG. 1 shows the positional relation between beam spots on a disc and beam spots on a photodetector, illustrating how a tracking error signal is generated in the DPP method.

A main spot SPm of the main beam is formed on an optical disc 211, while side spots SPs1 and SPs2 of two side beams are formed the optical disc 211, too. The side spots SPs1 and SPs2 are spaced from the main spot SPm in the opposite radial directions, respectively, by a distance of Tp/2 (180°), where Tp is the intervals (track pitch) at which grooves GR (i.e., recording tracks) are arranged.

Photodiode sections 212M, 212S1 and 212S2 constitute a photodetector 212. Spots SPm', SPs1' and SPs2' of light beams reflected from the optical disc 211, at the spots SPm, SPs1 and SPs2, are formed on the photodiodes 212M, 212S1 and 212S2, respectively. The photodiode section 212M comprises four photodiodes Da to Dd, which generate detection signals Sa to Sd. The photodiode section 212S1 comprises two photodiodes De and Df, which output detection signals Se and Sf. The photodiode section 212S2 comprises two photodiodes Dg and Dh, which output detection signals Sg and Sh.

FIG. 2 shows a circuit connection for generating a tracking error signal STE in the DPP method. A subtracter 221M subtracts the sum of the detection signals Sb and Sc from the sum of the detection signals Sa and Sd, generating a push-pull signal Sppm that corresponds to the light reflected from the main spot SPm. A subtracter 221S1 subtracts the detection signal Sf from the detection signal Se, generating a push-pull signal Spps1 that corresponds to the light reflected from the side spot SPs1. A subtracter 221S2 subtracts the detection signal Sh from the detection signal Sg, generating a push-pull signal Spps2 that corresponds to the light reflected from the side spot SPs2.

An adder 222 receives the push-pull signal Spps2 supplied via an amplitude adjuster 223 having gain G2. The adder 222 receives the push-pull signal Spps1, too. The adder 222 adds the push-pull signals Spps1 and Spps2, generating a sum signal Ss. A subtracter 224 receives the sum signal Ss via a amplitude adjuster 225 having gain G1. The substracter 224 receives the push-pull signal Sppm. The substracter 224 subtracts the sum signal Ss from the push-pull signal Sppm, generating a tracking error signal STE. Here, $G1=A1/2A2$, and $G2=A2/A3$, where A1 is the amplitude of the push-pull signal Sppm, A2 is the amplitude of the push-pull signal Spps1, and A3 is the amplitude of the push-pull signal Spps2. Thus, an offset is removed from the tracking error signal STE.

FIG. 3 depicts the positional relation between beam spots on a disc and beam spots on a photodetector, illustrating how a tracking error signal is generated in the three-spot method.

A main spot SPm of the main beam is formed on an optical disc 211, while side spots SPs1 and SPs2 of two side beams are formed the optical disc 211, too. The side spots SPs1 and SPs2 are spaced from the main spot SPm in the opposite radial directions, respectively, by a distance of Tp/4 (90°), where Tp is the intervals (track pitch) at which grooves GR (i.e., recording tracks) are arranged.

Photodiode sections 213M, 213S1 and 213S2 constitute a photodetector 213. Spots SPm', SPs1' and SPs2' of light beams reflected from the optical disc 211, at the spots SPm, SPs1 and SPs2, are formed on the photodiodes 213M, 213S1 and 213S2, respectively. The photodiode section 213M comprises four photodiodes Da to Dd, which generate detection signals Sa to Sd. The photodiode section 213S1 comprises a photodiodes Df, which outputs a detection signalsSf. The photodiode section 213S2 comprises a photodiode De, which outputs a detection signals Se.

FIG. 4 illustrates a circuit connection for generating a tracking error signal STE in the three-spot method. A subtracter 226 subtracts the detection signal Sf from the detection signal Se, generating the tracking error signal STE.

To increase the recording capacity of such an optical recording medium as described above, it is advisable to enhance the linear density or the track density. If the linear density of the optical recording medium is increased, the jitter in the signal reproduced from the medium will increase due to inter-code interference, unless the optical system for recording data signals on and reproducing them from the medium is modified in specification. If the track density is increased without modifying the optical system, a crosstalk will develop to make it difficult to reproduce the data signals reliably.

The problems described above can be solved by modifying the optical system, thereby reducing the diameter of the reading beam spot.

To reduce the diameter of the beam spot, various methods may be used. One method is to decrease the wavelength of the laser beam applied in the optical system. Another method is to increase the numerical aperture (NA) of the objective lens incorporated in the optical system. If the wavelength of the laser beam is changed, however, data signals will be neither recorded on, nor reproduced from, the existing CD-R. This is because the dye film, or recording layer, of the CD-R has reflectance that greatly depends on the wavelength of the laser beam. Further, if the NA of the objective lens is excessively large, coma-aberration will occur as the disc warps with respect to the axis of the laser beam or spherical aberration will develop due to the uneven thickness of the disc. The aberration, whether coma-aberration or spherical aberration, will increase the jitter in the signal reproduced from the medium.

Consider the detection of tracking error signals in the process of recording data signals on, or reproducing them from, various kinds of discs, each having recording tracks formed at a track density (track pitch) different from the track density of any one of the other discs. Then, the following problems seem to arise. To generate a tracking error signal STE in the DPP method, the side spots SPs1 and SPs2 are spaced, as described above, from the main spot SPm in the opposite radial directions, respectively, by a distance of Tp/2(180°), where Tp is the intervals (track pitch) at which grooves GR (i.e., recording tracks) are arranged. Hence, the side spots SPs1 and SPs2 are spaced from the main spot SPm by 1.6/2 μm (180°) in the opposite directions, as shown in FIG. 5A, in an optical disc drive that uses a CD (Compact Disc) having track pitch Tp of 1.6 μm.

In such an optical disc drive which holds an optical disc 211S having the track pitch Tp of 1.6 μm, the push-pull signals Sppm, Spps1 and Spps2 change as shown in FIGS. 5B, 5C and 5D, respectively, with the position the main spot SPm takes in the radial direction. In this case, the push-pull signals Spps1 and Spps2 are in the same phase. The tracking error signal STE therefore has a sufficient amplitude as is illustrated in FIG. 5E.

Assume that the optical disc drive holds an optical disc 211D which has a track pitch Tp of 1.07 μm, i.e., two-thirds of the track pitch of CDs, and which therefore has greater recording capacity than CDs. If so, it will be difficult for the disc drive to generate tracking error signals STE that have a sufficient amplitude.

In this case, the side spots SPs1 and SPs2 are spaced from the main spot SPm by 1.6/2 μm (270°) in the opposite directions, as shown in FIG. 6A, in an optical disc drive. Hence, the push-pull signals Sppm, Spps1 and Spps2 change as shown in FIGS. 6B, 6C and 6D, respectively, with the position the main spot SPm takes in the radial direction. The push-pull signals Spps1 and Spps2 are therefore in the opposite phases. The tracking error signal STE has but a small amplitude as is illustrated in FIG. 6E.

As indicated above, in an optical disc drive wherein the side spots SPs1 and SPs2 are spaced from the main spot SPm by 1.6/2 μm in the opposite directions, the tracking error signal STE generated by the DPP method has an extremely small amplitude if the disc drive holds an optical disc 211D which has a track pitch Tp of 1.07 μm, i.e., two-thirds of the track pitch of CDs. It is therefore difficult to use the optical disc 211D having track pitch Tp of 1.07 μm in this optical disc drive.

As mentioned above, too, the side spots SPs1 and SPs2 are spaced from the main spot SPm in the opposite radial directions, respectively, by a distance of Tp/4 in the process of generating a tracking error signal STE by means of the three-spot method. Thus, in an optical disc drive that holds a disc having a track pitch Tp of 1.6 μm as CDs, the side spots SPs1 and SPs2 are spaced from the main spot SPm in the opposite radial directions, respectively, by a distance of 1.6/4 μm (90°) as is illustrated in FIG. 7A.

Assume that this optical disc drive holds an optical disc 211S which has a track pitch Tp of 1.6 μm. Then, the main signal Sm (i.e., the sum of detection signals Sa and Sd), the detection signal Se and detection signal Sf change as shown in FIGS. 7B, 7C and 7D, respectively, with the position the main spot SPm takes in the radial direction. The detection signals signals Se and Sf are therefore in the opposite phases. The tracking error signal STE has a sufficient amplitude as is illustrated in FIG. 7E.

Let us assume that this optical disc drive holds an optical disc 211D which has a track pitch Tp of 1.07 μm, i.e., two-thirds of the track pitch of CDs and which therefore has greater recording capacity than CDs. It is therefore difficult for the disc drive to generate tracking error signals STE that have a sufficient amplitude.

In this case, the side spots SPs1 and SPs2 are spaced from the main spot SPm by 1.6/4 μm (135°) in the opposite directions, as shown in FIG. 8A, in an optical disc drive. The main signal Sm, detection signal Se and detection signal Sf therefore change as shown in FIGS. 8B, 8C and 8D, respectively, with the position the main spot SPm takes in the radial direction. The push-pull signals Spps1 and Spps2 are therefore in the opposite phases. The detection signals Se and Sf are not in the opposite phases. It follows that the tracking error signal STE has but a small amplitude as is illustrated in FIG. 8E.

As indicated above, in an optical disc drive wherein the side spots SPs1 and SPs2 are spaced from the main spot SPm by 1.6/4 μm in the opposite directions, the tracking error signal STE generated by the three-spot method has an extremely small amplitude if the disc drive holds an optical disc 211D which has a track pitch Tp of 1.07 μm, i.e., two-thirds of the track pitch of CDs. Thus, it is difficult to use the optical disc 211D having track pitch Tp of 1.07 μm in this optical disc drive.

BRIEF SUMMARY OF THE INVENTION

This invention has been made in consideration of the foregoing. The first object of the invention is to provide an optical recording/reproducing apparatus that can reliably record and reproduce data on and from not only the existing optical recording media, but also a high-density recording medium.

The second object of the invention is to provide an optical recording/reproducing apparatus that can generates a tracking error signal which is a desirable one, regardless of the track pitch of the recording medium used in the apparatus.

An optical recording/reproducing apparatus according to the invention is designed for use in combination with recording media that differ in track pitch, or a recording medium having recording regions that differ in track pitch. The apparatus comprises: drive means for rotating a recording medium; an optical head for applying light to the recording medium being rotated by the drive means, thereby to record data signals on the recording medium or reproducing data from the recording medium; and a signal-processing circuit for processing a signal detected by the optical head. The optical head comprises a light source for emitting light, an objective lens for condensing the light emitted by the light source on the recording medium and signal-detecting means for receiving the light reflected from the recording medium, thereby to detect signals. The objective lens has a numerical aperture NA, where $0.5 < NA \leq 0.6$.

The objective lens has a numerical aperture NA, where $0.5 < NA \leq 0.6$ in the optical recording/reproducing apparatus. The apparatus can, therefore, reliably record data on and reproduce data from a high-density optical recording media that have different track pitches.

An optical disc drive according to the invention is designed for use in combination with optical discs, each having recording tracks and differing in track pitch from any other optical disc, or an optical disc having recording regions, each having recording tracks and differing in track pitch from any other recording region. The optical head drive comprises: light beam applying means for forming a main spot, a first side spot and a second side spot on the optical disc, said first and second spots spaced apart from the main spot in the opposite radial directions; error signal generating means for generating a tracking error signal from light reflected from at least the first and second side spots, said tracking error signal representing a distance by which the main spot deviates from any recording track in the radial direction; and tracking control means for controlling the light beam applying means in accordance with the tracking error signal, thereby to move the main spot to a predetermined position on the recording track. The light beam applying means forms the first and second side spots, each between a first position and a second position. The first position is one each side spot takes to generate a tracking error signal of a maximum amplitude when the optical disc is one that has the longest track pitch. The second position is one each side spot takes to generate a tracking error signal of a maximum amplitude when the optical disc is one that has the shortest track pitch.

The first and second side spots are formed between the first position each side spot takes to generate a tracking error signal of a maximum amplitude when the optical disc and the second position each side spot takes to generate a tracking error signal of a maximum amplitude when the optical disc is one that has the shortest track pitch. Hence, the error signal generating means can generate a tracking error signal that has sufficient amplitude, regardless of the tracking pitch of the optical disc held in the disc drive. Thus, the disc drive can record and reproduce data on and from optical discs, each having recording tracks and differing in track pitch from any other optical disc, or an optical disc having recording regions, each having recording tracks and differing in track pitch from any other recording region.

The amplitude of the tracking error signal generated from the light reflected from an optical disc depends on the tracking pitch of the optical disc. In view of this, the optical disc drive may further comprise gain control means for controlling the gain of the error signal generating means, thereby causing the error signal generating means to generate a tracking error signal that has the same amplitude for different track pitches.

As has been described, the present invention can provide an optical recording/reproducing apparatus that can reliably record and reproduce data on and from not only the existing optical recording media, but also a high-density recording medium, by using an optical pickup having a specified numerical aperture and by making the pits smaller.

Moreover, the invention can provide an optical recording/reproducing apparatus, wherein a main spot, a first side spot and a second side spot are formed on the optical disc. The first and second spots spaced apart from the main spot in the opposite radial directions. A tracking error signal is generated from light reflected from at least the first and second side spots. The tracking error signal represents a distance by which the main spot deviates from any recording track in the radial direction. In accordance with the tracking error signal, the main spot is moved to a predetermined position on the recording track. The first and second side spots are located, each between a first position and a second position. The first position is one each side spot takes to generate a tracking error signal of a maximum amplitude when the optical disc is one that has the longest track pitch. The second position is one each side spot takes to generate a tracking error signal of a maximum amplitude when the optical disc is one that has the shortest track pitch. Therefore, the apparatus can generate a tracking error signal of sufficient amplitude, regardless of the track pitch of the optical disc. Additionally, the apparatus can record and reproduce data on and from optical discs, each having recording tracks and differing in track pitch from any other optical disc, or an optical disc having recording regions, each having recording tracks and differing in track pitch from any other recording region.

BRIEF DESCRIPTION OF THE SEVERAL VIEWS OF THE DRAWING

FIG. 5A is a diagram showing the positional relation that the beam spots on a disc having a track pitch Tp of 1.6 $\mu$m have to generate a tracking error signal STE in the DPP method (side spots are spaced by distance of 1.6 $\mu$m);

FIGS. 5B to 5D represent the waveforms of signals from which a tracking error signal STE will be generated by the DPP method;

FIG. 5E shows the waveform of the tracking error signal STE generated by the DPP method;

FIG. 6A is a diagram showing the positional relation that the beam spots on a disc having a track pitch Tp of 1.07 $\mu$m have to generate a tracking error signal STE in the DPP method (side spots are spaced by distance of 1.6 $\mu$m);

FIGS. 6B to 6D represent the waveforms of signals from which a tracking error signal STE will be generated by the DPP method;

FIG. 6E shows the waveform of the tracking error signal STE generated by the DPP method;

FIG. 7A is a diagram showing the positional relation that the beam spots on a disc having a track pitch Tp of 1.6 $\mu$m have to generate a tracking error signal STE in the three-spot method (side spots are spaced by distance of 1.6 $\mu$m);

FIGS. 7B to 7D represent the waveforms of signals from which a tracking error signal STE will be generated by the three-spot method;

FIG. 7E shows the waveform of the tracking error signal STE generated by the three-spot method;

FIG. 8A is a diagram showing the positional relation that the beam spots on a disc having a track pitch Tp of 1.07 $\mu$m have to generate a tracking error signal STE in the three-spot method (side spots are spaced by distance of 1.6 $\mu$m);

FIGS. 8B to 8D represent the waveforms of signals from which a tracking error signal STE will be generated by the three-spot method;

FIG. 8E shows the waveform of the tracking error signal STE generated by the three-spot method;

FIG. 14A is a diagram showing the positional relation that the beam spots on a disc having a track pitch Tp of 1.6 μm have to generate a tracking error signal STE in the DPP method (side spots are spaced by distance of 1.3 μm);

FIGS. 14B to 14D represent the waveforms of signals from which a tracking error signal STE will be generated by the DPP method;

FIG. 14E shows the waveform of the tracking error signal STE generated by the DPP method;

FIG. 15A is a diagram showing the positional relation that the beam spots on a disc having a track pitch Tp of 1.07 μm have to generate a tracking error signal STE in the DPP method (side spots are spaced by distance of 1.3 μm);

FIGS. 15B to 15D represent the waveforms of signals from which a tracking error signal STE will be generated by the DPP method;

FIG. 15E shows the waveform of the tracking error signal STE generated by the DPP method;

FIGS. 17B to 17D represent the waveforms of signals from which a tracking error signal STE will be generated by the three-spot method;

FIG. 17E shows the waveform of the tracking error signal STE generated by the three-spot method;

FIG. 18A is a diagram showing the positional relation that the beam spots on a disc having a track pitch Tp of 1.07 μm have to generate a tracking error signal STE in the three-spot method (side spots are spaced by distance of 1.3 μm);

FIGS. 18B to 18D represent the waveforms of signals from which a tracking error signal STE will be generated by the three-spot method; and FIG. 18E shows the waveform of the tracking error signal STE generated by the three-spot method.

DETAILED DESCRIPTION OF THE INVENTION

Embodiments of the present invention will be described, with reference to the accompanying drawings.

Figure 9:
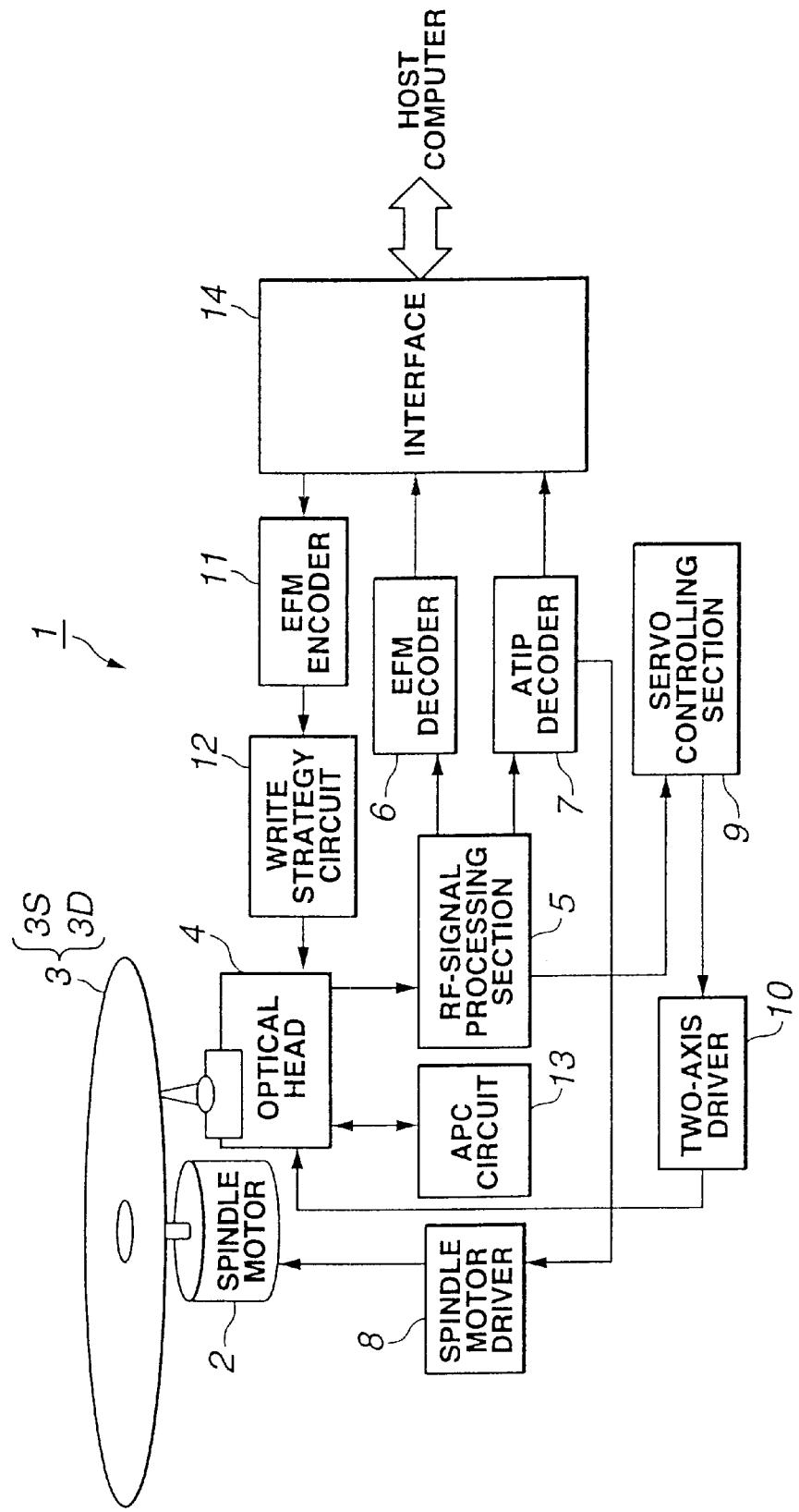
FIG. 9 is a block diagram illustrating an optical recording/reproducing apparatus according to the present invention.

FIG. 9 shows a recording/reproducing apparatus 1 according to the present invention. The recording/reproducing apparatus 1 is designed to record data on and reproduce data from an optical disc 3 that is rotated by a spindle motor 2 at a predetermined speed.

Figure 10:
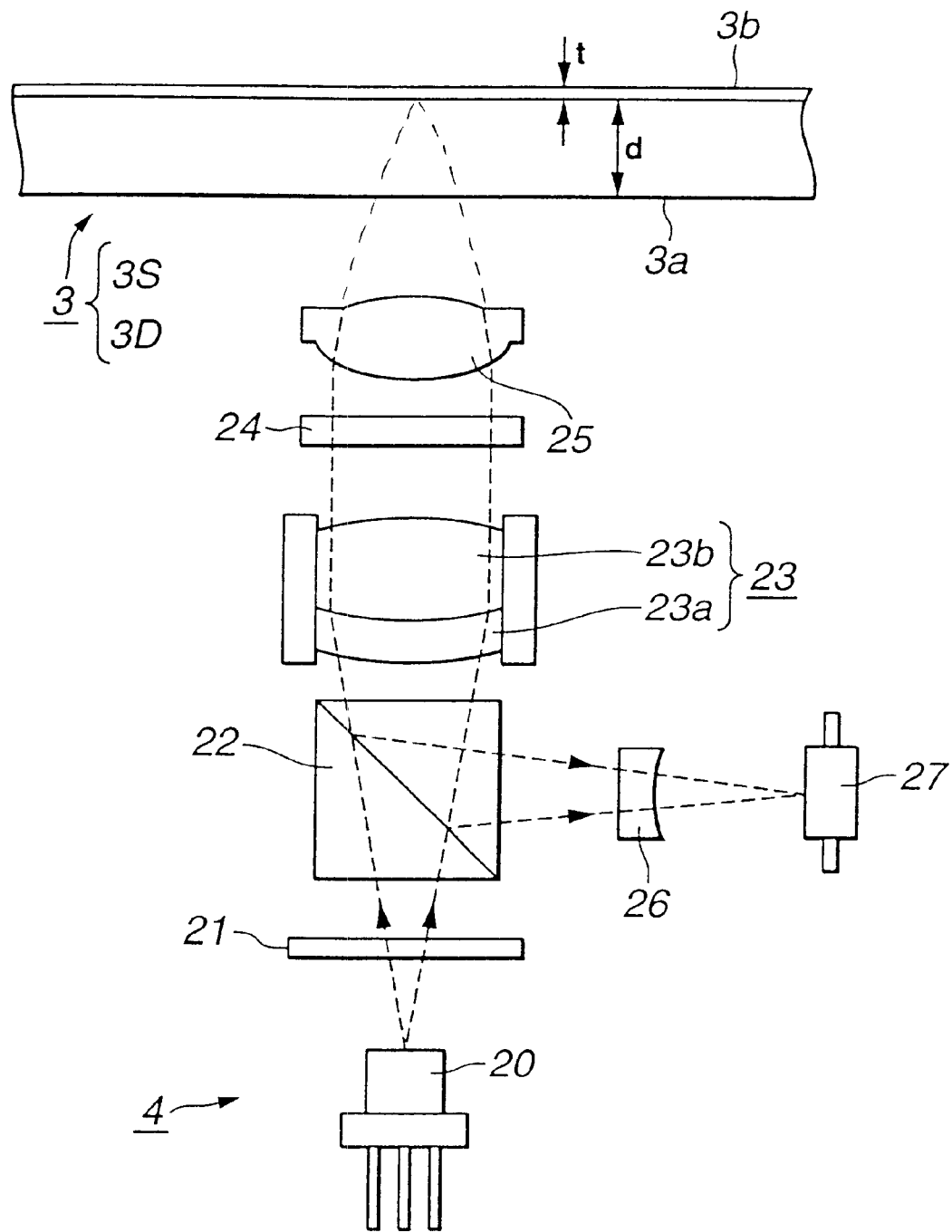
FIG. 10 is a schematic diagram of the optical head incorporated in the optical recording/reproducing apparatus according to the invention.

As shown in FIG. 10, the optical disc 3, on which the apparatus 1 performs the recording/reproducing operation, comprises a substrate 3a, a recording layer, and a protective film 3b. The substrate 3a has a thickness d of, for example, about 1.2 mm. The recording layer is formed on the substrate 3a and undergoes phase change to record data. The protective layer 3b has a thickness t of, for example, about 0.1 mm. A dye film may be provided on the recording layer as in CD-Rs.

A light beam is applied to the substrate 3a, thereby to record data on, or reproduce data from, the optical disc 3.

The disc 3 has a spiral groove GR (not shown in FIG. 10). The turns of the groove GR are used as tracks, on which data is recorded and from which data is reproduced. The drive 1 can use two types of discs. The first type is a disc 3S that has a track pitch Tp of 1.6 μm. The second type is a disc 3D that has a recording capacity about twice as much as that of the disc 3S. The disc 3D, which has a double recording density, has a track pitch Tp of 1.0 to 1.2 μm. More precisely, has a track pitch Tp of 1.10±0.03 μm. Its track pitch Tp is 1.07 μm in the present embodiment. The disc 3D has a minimum pit length (3T) that ranges from of 0.555 μm to 0.694 μm. More precisely, the minimum pit length (3T) of the disc 3D is about 0.625 μm, while the disc 3S having a track pitch Tp of 1.6 μm has a minimum pit length (3T) of 0.833 μm. The spindle motor 2 rotates the optical disc 3D at a linear velocity ranging from 0.8 m/sec to 1.0 m/sec. While the disc 3D is being so rotated, the optical head 4 records data on or reproduces data from the disc 3D.

The groove GR wobbles a little. The wobbling is used as an address at the time of recording data (that is, as the data showing the position of the blank disc). The wobbling is called ATIP (Absolute Time In Pregroove). The ATIP has been devised to generate address data of a recording medium such as a CD, on which data is recorded in relatively large units. The time data recorded on the disc is identical to the one that is recorded in the Q channel of the sub-code of the ordinary DCs.

The ATIP generates not only address data for use in recording data, but also various kinds of control signals and a sync signal for the rotation servo control at the time of recording data. Among the control signals recorded in the ATIP are a signal controlling the read-in start time, a signal controlling the read-out start time, a signal controlling the write power recommended for the media, and a signal designating the type of a disc. The read-in start time represents the maximum time for which data can be recorded on the media. The read-out start time pertains to the maximum program length.

The optical recording/reproducing apparatus 1 is desirable particularly for use in recording data signals on, and reproducing data signals from, the double-density optical disc 3D of the above-mentioned specification. Nonetheless, the apparatus 1 can reproduce data from the existing, single-density optical disc 3S, such as the CD, which has a track pitch Tp of 1.6±0.1 μm and a minimum pit length (3T) of about 0.833 μm. (The disc 3S may be a CD-ROM, a CD-R, a CD-RW or a CD-DA.) As shown in FIG. 9, the recording/reproducing apparatus 1 comprises an RF-signal processing section 5, an EFM decoder 6, an ATIP decoder 7, a spindle motor driver 8, a servo control section 9, a two-axis driver 10, an EFM encoder 11, a write strategy circuit 12, and an APC circuit 13, besides the spindle motor 2 and the optical head 4.

The optical head 4 applies a laser beam to the optical disc 3 being rotated by the spindle motor 2. The head 4 receives the light reflected from the optical disc 3 and converts the light to a data signal. In other words, the head 4 reproduces data from the optical disc 3.

The optical head 4 will be later described in detail as regards its structure. Here, only its objective lens 25 is described. The objective lens 25 is provided to converge the light emitted from the light source 20. The lens 25 has a numerical aperture (NA) that is greater than 0.5 and 0.6 at most, that is, 0.5<NA≦0.6. Since the lens 25 has such a numerical aperture (NA), i.e., 0.5<NA≦0.6, it is possible to record data on the optical disc 3 at a higher density than on the existing CD-R/RW, but in the same way as data is recorded on the existing CD-R/RW, without changing the substrate thickness (i.e., 1.2 mm) of the disc 3, only if the pits are made smaller.

The RF-signal processing section 5 generates a reproduced signal (RF signal), a focusing error signal, a tracking error signal and a wobble signal from the voltage signal supplied from the photodetector 27 that is provided in the optical head 4. The wobble signal represents the wobbling of the groove GR made in the optical disc 3. The reproduced signal (RF signal) thus generated by the processing section 5 undergoes, for example, equalizing process and digitizing process and is then supplied to the EFM decoder 6. The wobble signal generated in the RF-signal processing section 5 is supplied to the ATIP (Absolute Time In Pregroove) decoder 7. The focusing error signal and the tracking error signal are supplied to the servo control section 9.

The EFM decoder 6 effects EFM demodulation on the reproduced signal supplied as digital data from the RF-signal processing section 5. The EFM decoder 6 also performs error correction on the reproduced signal. The data subjected to the EFM demodulation and error correction in the EFM decoder 6 is supplied as the reproduced data through an interface 14 to a host computer or the like. The host computer or the like can therefore receive the signals reproduced from the optical disc 3.

The ATIP (Absolute Time In Pregroove) decoder 7 generates an ATIP signal from the wobble signal that has been supplied from the RF-signal processing section 5. The ATIP decoder 7 also detects the linear velocity of the optical disc 3 and generates a CLV (Constant Linear Velocity) signal that will keep rotating the optical disc 3 at a constant velocity. The CLV signal is supplied via the spindle motor driver 8 to the spindle motor 2. In accordance with the CLV signal the spindle motor 2 rotates the optical disc 3 at linear velocity that ranges from 0.8 m/sec to 1.0 m/sec. The ATIP signal contains address data that represents any position on the optical disc 3.

The servo control section 9 receives the focusing error signal supplied from the RF-signal processing section 5. In accordance with the focusing error signal the servo control section 9 drives the two-axis driver 10 that holds the optical head 4. Thus, the control section 9 effectuates focusing control, moving the optical head 4 toward or away from the optical disc 3. The servo control section 9 receives the tracking error signal supplied from the RF-signal processing section 5, too. In accordance with the tracking error signal drives the two-axis driver 10. Thus driven, the two-axis driver 10 carries out tracking control, moving the optical head 4 at right angles to the tracks provided on the optical disc 3.

The host computer may supply data to be recorded on optical disc 3, via the interface 14 to the EFM encoder 11. When the EFM encoder 11 receives the data, it performs EFM modulation or the like on the data, thereby generating a write signal. The write signal is supplied via the write strategy circuit 12 to the optical head 4. In the optical head 4, the light source 20 emits a laser beam that changes in intensity in accordance with the write signal supplied from the EFM encoder 11. The laser beam is applied to the optical disc 3, forming pits in the recording layer of the disc 3. The data is thereby recorded on the optical disc 3.

The APC (Auto-Power Control) circuit 13 measures the intensity of the laser beam the light source 20 of the optical head 4 has emitted. The APC circuit 13 then controls the drive power of the light source 20 to change the intensity of the laser beam to a predetermined value.

The optical head 4 incorporated in the recording/reproducing apparatus 1 will be described with reference to FIG. 10. As FIG. 10 shows, the optical head 4 comprises the light source 20, objective lens 25 and photodetector 27. The optical head 4 further comprises a diffraction lattice 21, a beam splitter 22, a collimator lens 23, an a quarter-wave plate 24 and a multi-lens 26.

The light source 20 is a device that emits a light beam toward the optical disc 3 in order to record data on, or reproduce data from, the optical disc 3. More specifically, the light source 20 is a semiconductor laser that emits a linear, polarized laser beam having a wavelength $\bar{e}$ of 780 (±10) nm. The light source 20 emits a laser beam of a specific intensity to reproduce data signals from the optical disc 3, and a laser beam of a different intensity to record data signals on the optical disc 3.

The laser beam emitted from the light source 20 is applied to the diffraction lattice 21. The lattice 21 diffracts the laser beam. The lattice 21 also splits the laser beam into at least three beams to accomplish tracking servo control by the so-called DPP (Deferential Push Pull) method or the so-called three-spot method. The tracking servo control will be described in detail, in conjunction with second embodiment of the present invention.

The zero-order light beam and ±1-order light beam the diffraction lattice 21 has emitted passes through the beam splitter 22 and is applied to the collimator lens 23. (Hereinafter, these light beams shall be collectively referred to as "incident laser beam.") The collimator lens 23 comprises, for example, two spherical lenses 23a and 23b combined together.

The collimator lens 23 converts the incident laser beam to a parallel light beam.

As pointed out above, the collimator lens 23 is a combination lens that comprises two lenses 23a and 23b. It can functions as a chromatism-correcting lens, as well. Such a chromatism-correction lens comprising two lenses exhibits the same focal distance to two light beams that have different wavelengths. The collimator lens 23 can therefore remove a greater part of chromatism from the incident laser beam applied to it.

The incident laser beam emitted from the collimator lens 23 passes through the quarter-wave plate 24 and is applied to the objective lens 25. The incident laser beam changes to a circularly polarized light as the laser beam passes through the quarter-wave plate 24. The circularly polarized light is applied to the objective lens 25.

The objective lens 25 is provided to converge the incident laser beam at the recording layer of the optical disc 3. That is, the lens 25 converges the incident laser beam, or the circularly polarized light output from the quarter-wave plate 24. The laser beam converged by the lens 25 passes through the protective film 3b, or transparent layer, of the optical disc 3 and is applied to the recording layer of the optical disc 3.

In the present invention, the objective lens 25 provided in the optical head 4 has a numerical aperture (NA) that is greater than 0.5 and 0.6 at most, that is, 0.5<NA≦0.6.

The existing playback-only optical disc drive designed to reproduce data signals from CD-R/RWs has an optical system that comprises an objective lens having a numerical aperture of about 0.45. On the other hand, the existing optical disc drive designed to record data signals on recordable discs has an optical system that comprises an objective lens having a numerical aperture of approximately 0.50.

The inventors hereof conducted researches in an effort to develop an apparatus than can reliably record data, and reproduce data from, not only the existing CD-R/RWs but also double-density optical disc 3D. They found it possible to record data on the existing CD-R/RWs at a density higher than is possible at present, forming smaller pits in the CD-R/RWs, without changing the substrate thickness (1.2 mm) of the CD-R/RW discs, if the objective lens 25 has a numerical aperture (NA) greater than 0.5 and 0.6 at most, that is, 0.5<NA≦0.6.

If NA≦0.5, the recording density cannot increase, though data can be recorded on the existing CD-R/RWs and a sufficient tilt margin can be preserved. If NA=0.5, no problems will arise in reproducing data from the existing CD-R/RWs, but problems will arise in recording data on CD-RWs that have a phase-change film. As known in the art, the light beam applied to a CD-RW to record data thereon has a small diameter. Hence, if an optical pickup having a large numerical aperture writes new data is written over the data recorded on the CD-RW by using an objective lens having a numerical aperture of 0.5, some of the data remains not erased from the CD-RW.

If NA>0.6, the recording density will increase indeed. In this case, however, the tilt margin is so small that the optical head may not be put to practical use. Moreover, jitter will increase if the disc warps. In the case of a CD-RW that has a phase-change film as the recording film, the phase-change film may be heated to high temperatures if the objective lens 25 has a large NA and reduces the diameter of the beam spot on the phase-change film. If the phase-change film is heated too much, its characteristic may be deteriorated since the characteristic greatly depends on the temperature.

Thus, data can be recorded on and reproduced from the existing CD-R/RWs as well, while increasing the recording density and maintaining a sufficient tilt margins, because the objective lens 25 has a numerical aperture (NA) greater than 0.5 and 0.6 at most, that is, 0.5<NA≦0.6. It is desired that the objective lens 25 have a numerical aperture (NA) of 0.55 that falls within the range specified above.

The incident laser beam converged by the objective lens 25 and applied to the recording layer of the optical disc 3 is reflected at the recording layer, becoming a returning light beam. The returning light beam passes through the objective lens 25 and is applied to the quarter-wave plate 24. The quarter-wave plate 24 rotates the returning light beam by 90°, converting the same to a linear polarized light. Thereafter, the collimator lens 23 converges the returning light beam. The returning light beam, thus converged, is applied to the beam splitter 22. The beam splitter 22 reflects the returning light beam.

The returning light beam output from the beam splitter 22 passes through the multi-lens 26 and is detected by the photodetector 27. The multi-lens 26 has a cylindrical light-receiving surface and a concave light-emitting plane. The multi-lens 26 imparts astigmatism to the returning light beam in order to accomplish focusing servo control by means of so-called astigmatism method.

The photodetector 27 that is provided to detect the returning light beam to which astigmatism has been imparted by the multi-lens 26 has, for example, six photodiodes. The photodetector 27 generates electric signals that correspond to the intensities of light beams the six photodiodes have received and effects a prescribed operation on the electric signals. The electric signals are supplied to the RF-signal processing section 5.

An optical recording/reproducing apparatus that is identical to the apparatus 1 described above was manufactured. The apparatus was tested in the same conditions as described above, except that objective lens of different numerical apertures (ANs) were used interchangeably as shown in the following Table 1. In the test, the apparatus recorded test signals on, and reproduced them from, CD-RWs that have a phase-change recording film each, thereby evaluating the recording density, the compatibility with the existing CDs and the tilt margin.

In Table 1, the double circuit represents a characteristic item that is fully satisfactory, the circle indicates a characteristic item that achieves the data-recording/reproducing, and the cross shows a characteristic item that impairs reliable data-recording/reproducing.

The results of the test are shown in Table 1.

TABLE 1

|  | NA ≦ 0.5 | 0.5 < NA ≦ 0.6 | 0.6 < NA |
|---|---|---|---|
| Recording density | x | ○ | ⊙ |
| CD-compatibility | ⊙ | ○ | x |
| Tilt margin | ⊙ | ○ | x |

As seen from Table 1, if NA≦0.5, the compatibility with the existing CDs can be attained and the tilt margin can be sufficient, but the recording density cannot be increased. If 0.6<NA, the recording density can increase, but the tilt margin is very small, inevitably increasing jitter due to the warping of the disc.

Hence, the tilt margin and the recording density can be enhanced, while preserving the compatibility with the existing CDs, if 0.5<NA≦0.6. The numerical aperture (NA) of 0.55 is the most preferable of all possible NA values falling with this range.

Figure 11:
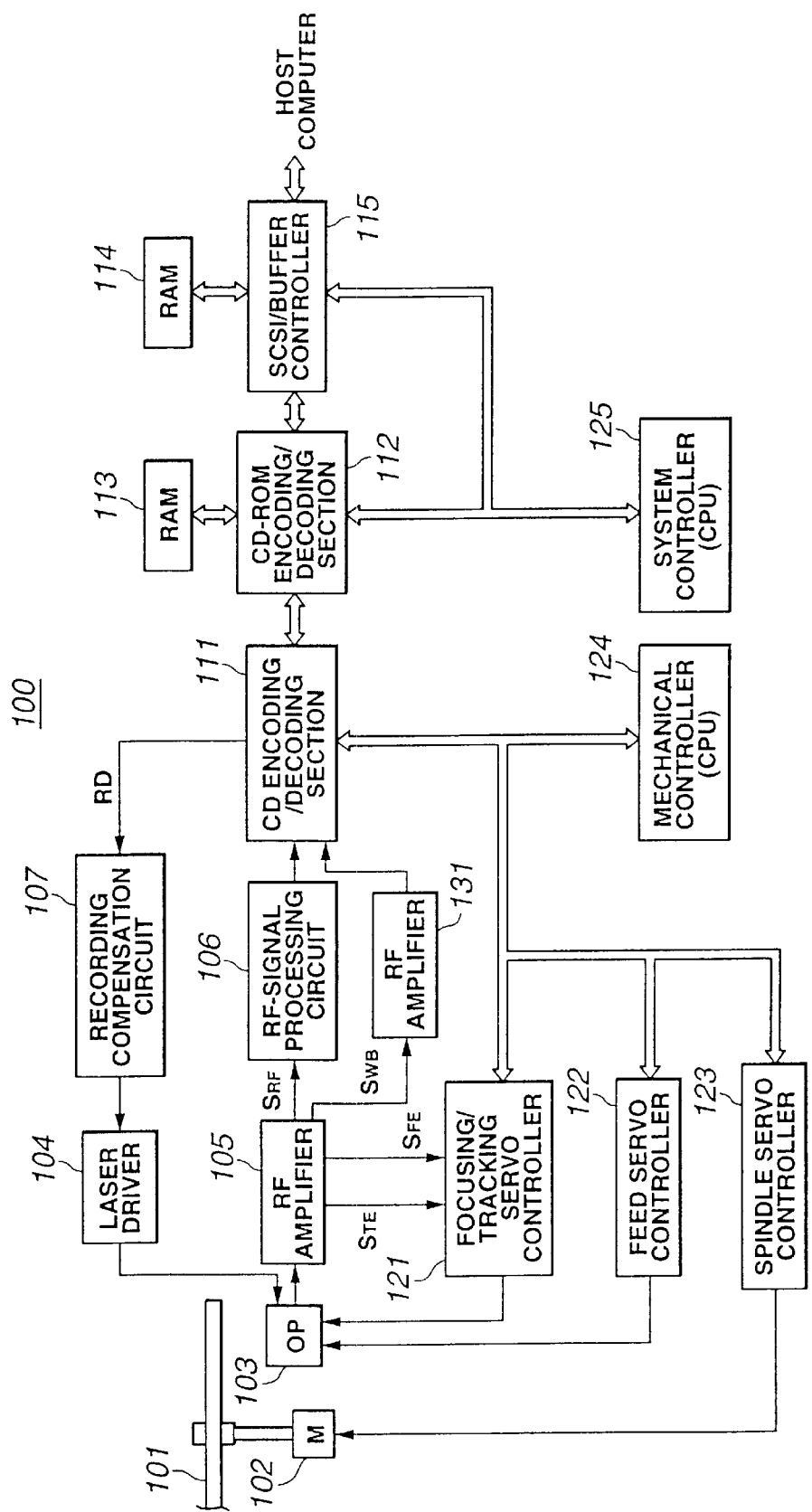
FIG. 11 is a block diagram of a CD-R drive.

The second embodiment of this invention will be described. FIG. 11 shows an optical disc drive 100, i.e., the second embodiment of the invention.

Like the optical disc 3 used in the first embodiment, the optical disc 101 (101S or 101D) used in this drive 100 has a spiral groove GR. The turns of the groove GR are used as tracks, on which data is recorded and from which data is reproduced. The optical disc 101 is similar to the optical disc 3 (3S or 3D) in any other respect. Therefore, the disc 101 will not be described in detail.

The drive 100 can use two types of discs. The first type is a disc 101S that has a track pitch Tp of 1.6 μm. The second type is a disc 101D that has a track pitch Tp of 1.07 μm.

The drive 100 comprises a spindle motor driver 102, an optical pickup 103, a laser driver 104, and an RF amplifier 105. The spindle motor 102 drives the disc 101 at a constant linear velocity. The optical pickup 103 comprises a semiconductor laser, an objective lens, a photodetector, etc. The laser driver 104 drives the semiconductor laser to control the emission of light from the optical pickup 103. The RF amplifier 105 receives and processes the output signal of the photodetector incorporated in the optical pickup 103, thereby to reproduce an RF signal SRF and to generate a tracking error signal STE, a focusing error signal SFE and a wobble signal SWB. Note that the wobble signal SWB represents the wobbling of the groove GR.

The semiconductor laser of the optical pickup 103 applies a laser beam (not shown) to the recording surface of the optical disc 101. The laser beam is reflected from the disc 101 and applied to the photodetector of the optical pickup 103. The RF amplifier 105 generates a tracking error signal STE by DPP method and a focusing error signal SFE by astigmatism method.

The drive 100 further comprises an RF-signal processing circuit 106 and a recording compensation circuit 107. The RF-signal processing circuit 106 detects the RF signal SRF reproduced and performs waveform equalization on the RF signal SRF, thereby generating CD data. The record compensation circuit 107 effects record compensation on the record data RD output from an CD encoding/decoding section (later described). The circuit 107 supplies the record data RD to the laser driver 104. The laser beam the optical pickup 103 has emitted is modulated with the record data RD. The record data RD is thereby recorded on the disc 101.

The driver 100 further comprises a CD encoding/decoding section 111 and a CD-ROM encoding/decoding section 112. In the process of reproducing data from the optical disc 101, the CD encoding/decoding section 111 demodulates EFM (Eight-to-Fourteen Modulated) CD data output from the RF-signal processing circuit 106. The section 111 also corrects the CD data by using CIRCs (Cross Interleave Reed-Solomon Codes), thus generating CD-ROM data. In the process of recording data on the optical disc 101, the section 111 applies CIRCs to the CD-ROM data output from the CD-ROM encoding/decoding section 112, thereby imparting parity to the CD-ROM data. Further, the section 111 performs EFM on the CD-ROM data, generating CD data, and then effects NRZI (Non Return to Zero Inverted) conversion on the CD data, thus generating record data RD.

In the process of reproducing data from the optical disc 101, the CD-ROM encoding/decoding section 112 descrambles and corrects the CD-ROM data output from the CD encoding/decoding section 111, thus generating read data. In the process of recording data on the optical disc 101, the section 112 imparts correction parity to the write data received from an SCSI/buffer controller (later described) and scrambles the write data, thereby generating CD-ROM data. The CD-ROM encoding/decoding section 112 is connected to a RAM (Random Access Memory) 113 that is a work memory.

The driver 100 has an SCSI (Small Computer System Interface)/buffer controller 115. The SCSI/buffer controller 115 receives commands from a host computer. In the driver 100, the controller 115 supplies the commands to the system controller 125 (later described). In the process of reproducing data from the disc 101, the controller 115 receives the read data output by the CD-ROM encoding/decoding section 112 and transfers the same to the host computer via a RAM 114 that is provided as a buffer memory. In the process of recording data on the disc 101, the SCSI/buffer controller 115 receives the write data from the host computer and supplies the same to the CD-ROM encoding/decoding section 112 through the RAM 114.

The drive 100 further comprises a focusing/tracking servo controller 121, a feed servo controller 122, and a spindle servo controller 123. The focusing/tracking servo controller 121 receives a focusing error signal SFE and a tracking error signal STE from the RF amplifier 105. In accordance with the errors signals SFE and STE, the controller 121 performs focusing servo control and tracking servo control on the optical pickup 103. The feed servo controller 122 moves the optical pickup 103 to a target track provided on the optical disc 101. The spindle servo controller 123 controls the spindle motor 102 so that the motor 102 may rotate the disc 101 at a predetermined rotation speed. The focusing/tracking servo controller 121 and spindle servo controller 123 are controlled by a mechanical controller 124 that incorporates a CPU (Central Processing Unit).

The drive 100 has a system controller 125 that controls the other components of the drive 100. The system controller 125 includes a CPU.

The drive 100 has a wobbling process section 131. This section 131 is designed to decode an ATIP signal from the wobble signal SWB output from the RF amplifier 105. The ATIP signal generated by the section 131 is supplied via the CD encoding/decoding section 111 to the mechanical controller 124 and system controller 125. The ATIP signal is used to accomplish various controls.

Figure 12:
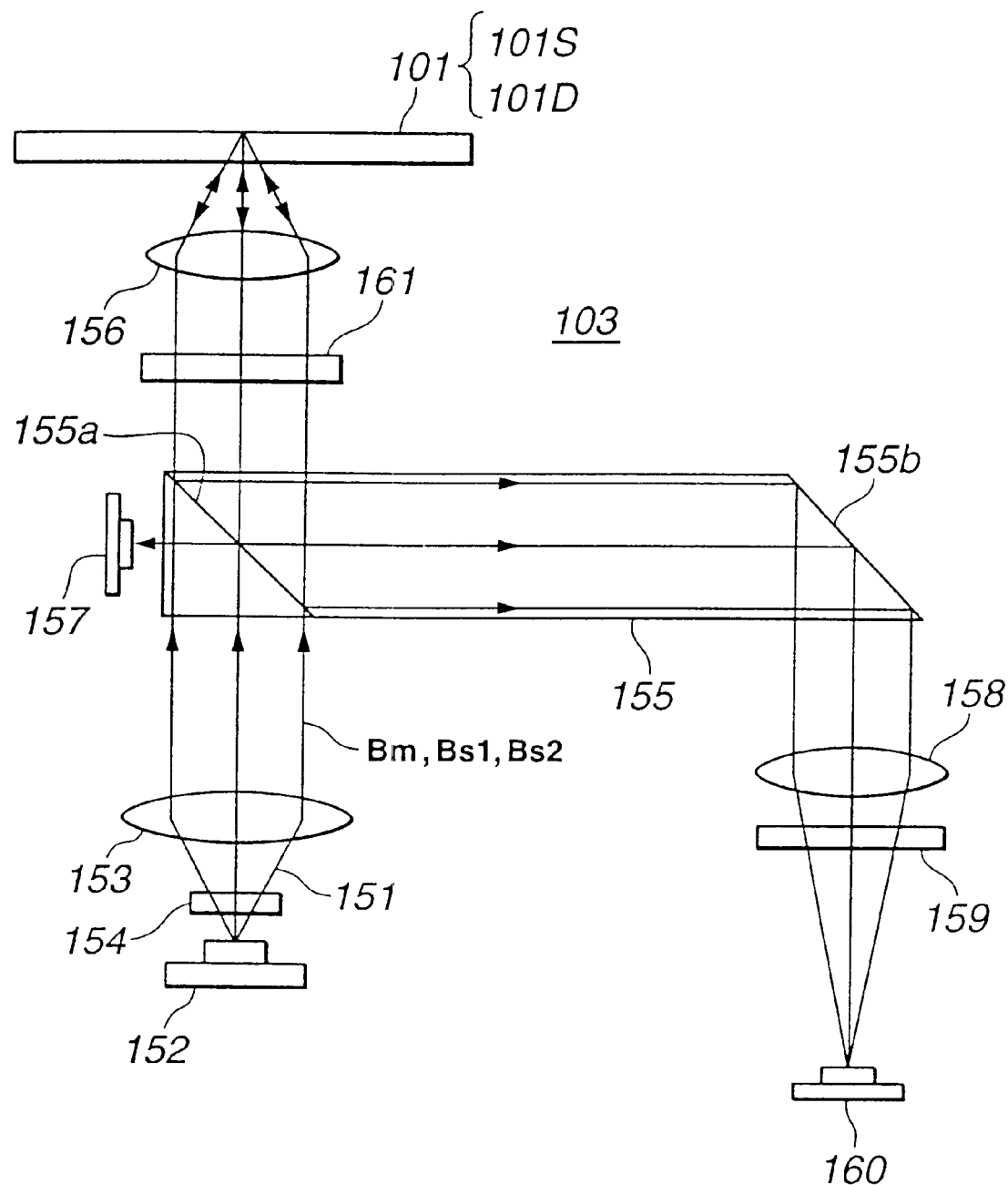
FIG. 12 is diagram showing an optical pickup.

The optical pickup 103 will now be described in detail. FIG. 12 shows the optical system of the pickup 103.

As FIG. 12 shows, the optical pickup 103 has a semiconductor laser 152 and a collimator lens 153. The semiconductor laser 152 emits a laser beam 151. The collimator lens 153 changes the laser beam 151 to a parallel beam. More precisely, the semiconductor laser 152 is one that emits a laser beam having a wavelength ë of 780 (±10) nm.

A grating (diffraction lattice) 154 is provided between the semiconductor laser 152 and the collimator lens 153, The grating 154 forms three beams, that is, the main beam Bm and two side beams Bs1 and Bs2. The main beam Bm is a zero-order light beam. The first side beam Bs1 is a +1-order light beam. The second side beam Bs2 is a −1-oder light beam.

The optical pickup 103 further comprises a beam splitter 155, a quarter-wave plate 161, an objective lens 156, and a photodetector 157. The beam splitter 155 has a semitransparent film 155a and a reflecting surface 155b. The objective lens 156 applies a laser beam to the recording surface of the optical disc 101. The photodetector 157 serves to achieve front APC (Automatic Power Control).

The objective lens 156 is of the same type as used in the first embodiment. Its numerical aperture (NA) is greater than 0.5 and 0.6 at most, that is, 0.5<NA≦0.6. The lens 156 has, for example, a numerical aperture of 0.55.

A part of the laser beam applied from the collimator lens 153 to the beam splitter 155 passes through the semitransparent film 155a of the beam splitter 155 before it is applied to the objective lens 156. The semitransparent film 155a reflects the other part of the laser beam, which is applied to the photodetector 157. The semitransparent film 155a reflects a part of the laser beam applied from the objective lens 156 to the beam splitter 155. This part of the laser beam is emitted from the optical path between the disc 101 and the semiconductor laser 152.

The optical pickup 103 further has a condensing lens 158, a photodetector 160, and a multi-lens 159. The condensing lens 158 receives and converges the laser beam reflected by the reflecting surface 155b of the beam splitter 155. The photodetector 160 receives the laser beam from the condensing lens 158. The multi-lens 159 is arranged between the condensing lens 158 and the photodetector 160. The multi-lens 159 is a combination lens comprising a concave lens and a cylindrical lens. The cylindrical lens is employed to generate a focusing error signal SFE by means of the astigmatism method that is known in the art.

The main beam Bm and the side beams Bs1 and Bs2 are applied to the disc 101, forming a main spot SPm and two side spots SPs1 and SPs2 on the disc 101. The side spots SPs1 and SPs2 are spaced from the main spot SPm in the opposite radial directions by a predetermined distance.

As indicated above, the disc drive 100 (i.e., the second embodiment) generates a tracking error signal STE by the DPP method and can use two types of optical discs, i.e., a disc 101S that has a track pitch Tp of 1.6 μm and a disc 101D that has a track pitch Tp of 1.07 μm. Therefore, the side spots SPs1 and SPs2 must be spaced from the main spot SPm in the opposite radial directions by a distance that is shorter than half the maximum track pitch (1.6 μm) and longer than half the minimum track pitch (1.07 μm).

The side spots SPs1 and SPs2 may be spaced from the main spot SPm in the opposite radial directions by a distance of 1.6/2 μm. Then, the tracking error signal STE generated by the DPP method will be maximal amplitude if the disc drive 100 (second embodiment) uses the disc 101S having the track pitch Tp of 1.6 μm. Alternatively, the side spots SPs1 and SPs2 may be spaced from the main spot SPm in the opposite radial directions by a distance of 1.07/2 μm. In this case, the tracking error signal STE generated by the DPP method will be maximal amplitude if the disc drive 100 uses the disc 101D having the track pitch Tp of 1.07 μm.

Figure 13:
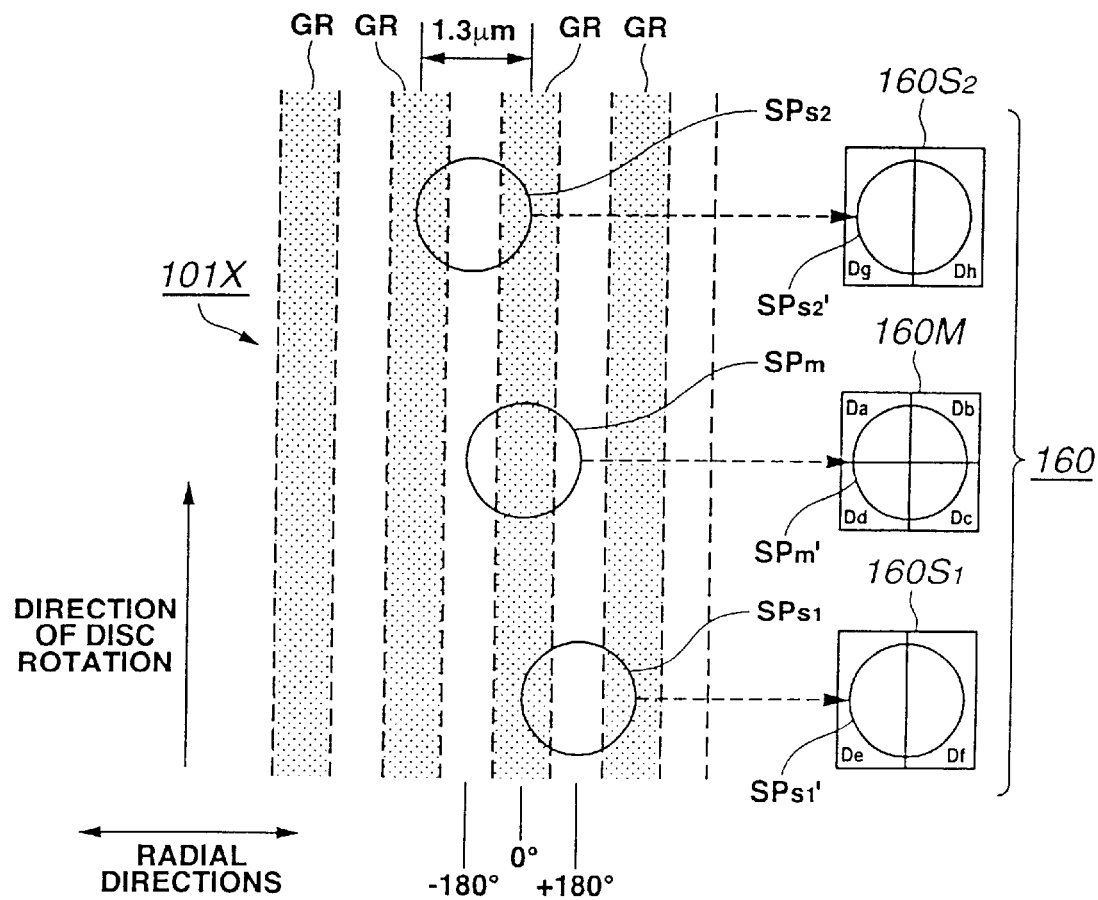
FIG. 13 is a diagram showing the positional relation between beam spots on a disc and beam spots on a photodetector, illustrating how a tracking error signal is generated in the DPP method.

In the second embodiment, the side spots SPs1 and SPs2 are formed on an optical disc 101X that has a track pitch Tp of 1.3 μm as is illustrated in FIG. 13. To state more specifically, the side spots SPs1 and SPs2 are spaced from the main spot SPm in the opposite radial directions by a distance of 1.3/2 μm. The positions of the side spots SPs1 and SPs2 can be adjusted, merely by changing the angle of the grating 154.

As shown in FIG. 13, the photodetector 160 comprises one four-segment photodiode section 160M and two two-segment photodiode sections 160S1 and 160S2.

How the optical pickup 103 sown in FIG. 12 operates will be described. The laser beam 151, a diverging light beam, emitted from the semiconductor laser 152 is applied to the grating 154. The grating 154 forms three beams Bm, Bs1 and Bs2. The beams Bm, Bs1 and Bs2 are applied from the grating 154 to the collimator lens 153. The collimator lens 153 converts the beams Bm, Bs1 and Bs2 to parallel beams, which are applied to the beam splitter 155. Parts of the beams Bm, Bs1 and Bs2, which pass through the semitransparent film 155a of the beam splitter 155, are applied to the recording surface of the disc 101 after travelling through the quarter-wave plate 161 and the objective lens 156. As a result, the main beam Bm and side beams Bs1 and Bs2 form three spots SPm, SPs1 and SPs2 on the disc 101, as is illustrated in FIG. 11.

The laser beam reflected from the recording surface of the disc 101 is applied to the beam splitter 155 after passing through the objective lens 156 and the quarter-wave plate 161. The semitransparent film 155a of the beam splitter 155 reflects the laser beam. Further, the reflecting surface 155b of the beam splitter 155 reflects the laser beam. The laser beam emerging from the beam splitter 155 is applied to the photodetector 160 through the condensing lens 158 and the multi-lens 159.

As shown in FIG. 13, three spots SPm', SPs1' and SPs2' are formed on the photodiode sections 160M, 160S1 and 160S2 that constitute the photodetector 160, respectively, as three laser beam are reflected from the spots SPm, SPs1 and SPs2 formed on by the disc 101.

The RF amplifier 105 (see FIG. 11) reproduces an RF signal SRF and generates a focusing error signal SFE by performing the following operations:

$$SRF = (Sa+Sb+Sc+Sd)$$

$$SFE = (Sa+Sc)-(Sb+Sd)$$

where Sa, Sb, Sc and Sd are signals output from the four photodiodes Da to Dd constituting the photodiode section 160M, Se and Sf are signals output from the two photodiodes De and Df forming the photodiode section 160S1, and Sg and Sh are signals output from the two photodiodes Dg and Dh forming the photodiode section 160S2.

The RF amplifier 105 subtracts the sum of signals Sb and Sc from the sum of signals Sa and Sd, thus generating a push-pull signal Sppm that corresponds to the light reflected from the main spot SPm. A high-pass filter extracts a wobble signal from the push-pull signal Sppm thus generated.

Figure 1:
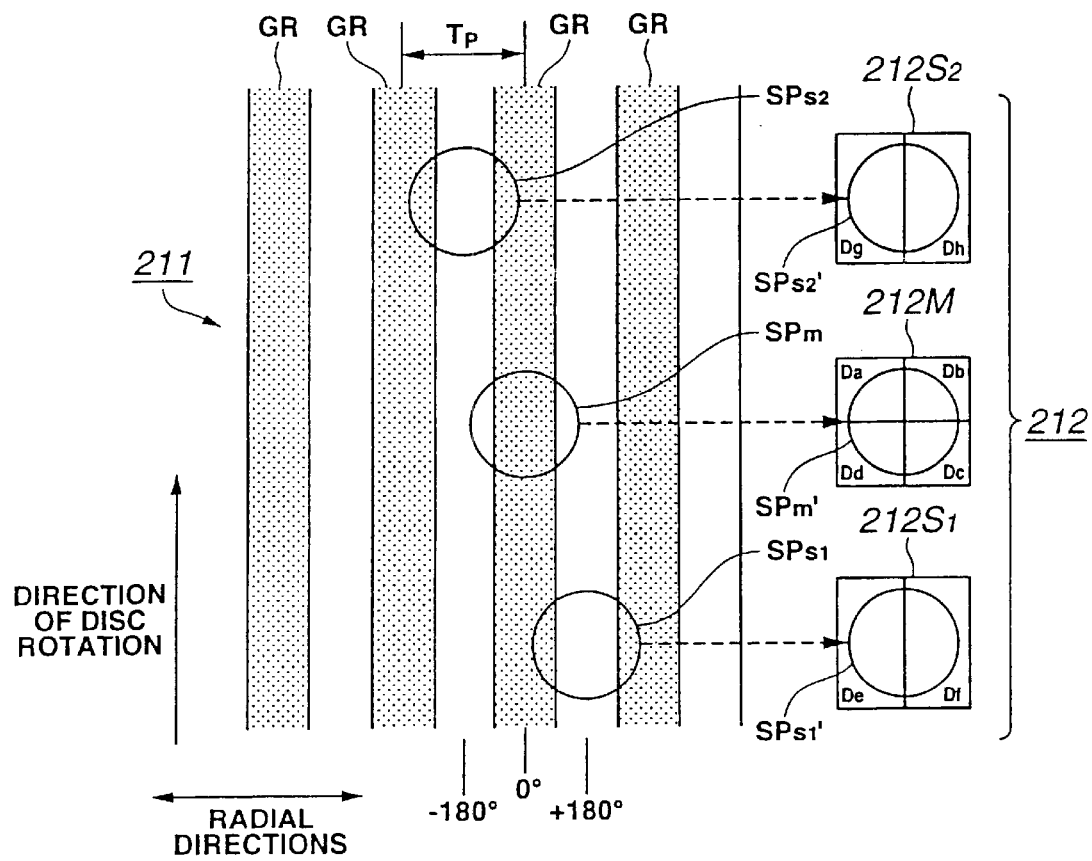
FIG. 1 is a diagram showing the positional relation between beam spots on a disc and beam spots on a photodetector, illustrating how a tracking error signal is generated in the DPP method.
Figure 2:
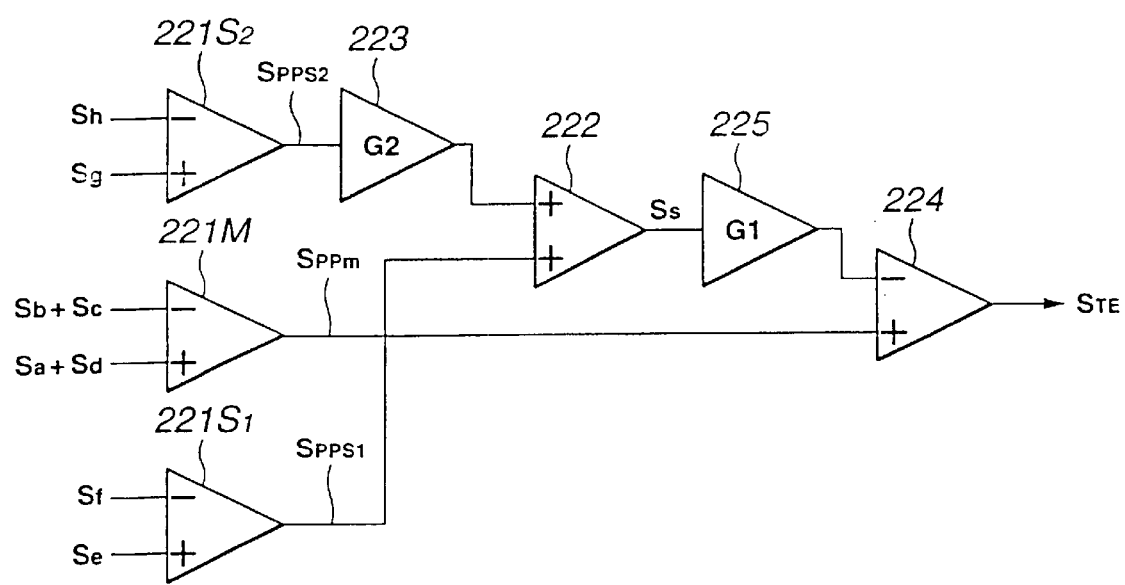
FIG. 2 is a diagram showing a circuit connection for generating a tracking error signal in the DPP method.
Figure 3:
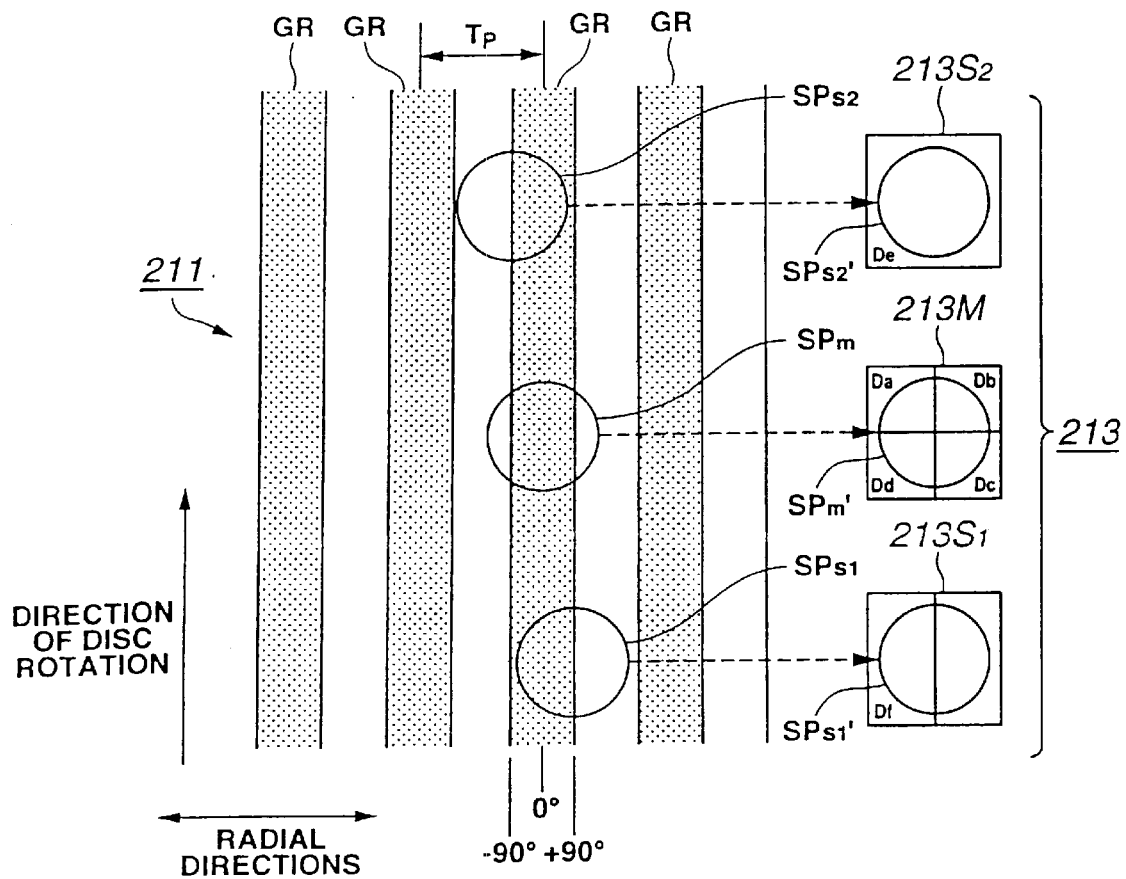
FIG. 3 is a diagram depicting the positional relation between beam spots on a disc and beam spots on a photodetector, illustrating how a tracking error signal is generated in the three-spot method.

In the RF amplifier 105, the circuit shown in FIG. 2 generates a tracking error signal STE by the DPP method. More precisely, the subtracter 221M subtracts the sum of the detection signals Sb and Sc from the sum of the detection signals Sa and Sd, generating a push-pull signal Sppm that corresponds to the light reflected from the main spot SPm. The subtracter 221S1 subtracts the detection signal Sf from the detection signal Se, generating a push-pull signal Spps1 that corresponds to the light reflected from the side spot SPs1. The subtracter 221S2 subtracts the detection signal Sh from the detection signal Sg, generating a push-pull signal Spps2 that corresponds to the light reflected from the side spot SPs2.

The adder 222 receives the push-pull signal Spps2 supplied via an amplitude adjuster 223 having gain G2. The adder 222 adds the push-pull signals Spps1 and Spps2, generating a sum signal Ss. The subtracter 224 receives the sum signal Ss via an amplitude adjuster 225 having gain G1. The substracter 224 subtracts the sum signal Ss from the push-pull signal Sppm, generating a tracking error signal STE.

Assume that the disc drive holds a disc 101S that has a track pitch Tp of 1.6 μm. In this case, the side spots SPs1 and SPs2 are spaced from the main spot SPm in the opposite radial directions by a distance of 1.3/2 μm (146°) as is shown in FIG. 14A. The push-pull signals Sppm, Spps1 and Spps2 therefore change as is illustrated in FIGS. 14B, 14C and 14D with respect to the position the main spot SPm takes in the radial direction. Thus, the push-pull signals Spps1 and Spps2 would not be in the opposite phases. The tracking error signal STE therefore has sufficient amplitude, as seen from FIG. 14E.

Assume that the disc drive holds a disc 101D that has a track pitch Tp of 1.07 μm. Then, the side spots SPs1 and SPs2 are spaced from the main spot SPm in the opposite radial directions by a distance of 1.3/2 μm (218°) as is shown in FIG. 15A. The push-pull signals Sppm, Spps1 and Spps2 therefore change as is illustrated in FIGS. 15B, 15C and 15D with respect to the position the main spot SPm takes in the radial direction. In this case, too, the push-pull signals Spps1 and Spps2 would not be in the opposite phases. The tracking error signal STE therefore has sufficient amplitude, as seen from FIG. 15E.

The tracking error signal STE has an amplitude while the disc drive holds the disc 101S that has the track pitch Tp of 1.6 μm, and a different amplitude while the disc drive holds the disc 101D that has the track pitch Tp of 1.07 μm. Whichever disc the disc drive holds, it is required that the tracking error signal STE should have the same amplitude.

To this end, the gain of the subtracter 224 or the like, incorporated in the circuit of FIG. 2, may be controlled in accordance with the track pitch of the optical disc.

It will be described how the optical disc drive 100 shown in FIG. 11 operates.

The host computer may give a data write command to the system controller 125. If so, the disc drive 100 writes (records) data on the optical disc it holds. The SCSI/buffer controller 115 receives the write data from the host computer and supplies the same to the CD-ROM encoding/decoding section 112. The CD-ROM encoding/decoding section 112 imparts correction parity to the write data received from a SCSI/buffer controller (later described) and scrambles the write data and scrambles the write data, thereby generating CD-ROM data.

The CD-ROM data generated in the CD-ROM encoding/decoding section 112 is supplied to the CD encoding/decoding section 111. The section 111 adds parity to the CD-ROM data by applying a CIRC and performs EFM modulation on the CD-ROM data, thereby generating CD data. Additionally, the CD encoding/decoding section 111 carries out NRZI conversion on the CD data, whereby record data RD is generated.

The record compensation circuit 107 effects record compensation on the record data RD. The circuit 107 supplies the record data RD to the laser driver 104. The laser beam the optical pickup 103 has emitted is modulated with the record data RD. The record data RD is thereby recorded on the disc 101.

The host computer may give a data read command to the system controller 125. In this case, the disc drive 100 reads (reproduces) data from the optical disc it holds. The RF-signal processing circuit 106 performs waveform equalization or the like on the RF signal reproduced by the optical pickup 103. CD data is thereby generated. The CD data is supplied to the CD encoding/decoding section 111. The section 111 performs EFM demodulation the reproduced data and corrects the errors contained in the reproduced data by applying a CIRC. CD-ROM data is thereby generated.

The CD-ROM data generated in the section 111 is supplied to the CD-ROM encoding/decoding section 112. The section 112 de-scrambles the CD-ROM data and corrects the errors contained in the CD-ROM data, thus generating read data. The read data is transferred to the host computer via the RAM 114 (serving as a buffer memory) at a predetermined timing, under the control of the SCSI/buffer controller 115.

In the present embodiment, the side spots SPs1 and SPs2 are spaced from the main spot SPm in the opposite radial directions by a distance shorter than 1.6/2 $\mu$m and longer than 1.07/2 $\mu$m, as has been pointed out. Hence, a tracking error signals STE having an adequate amplitude can be obtained by the DPP method, not only when the disc drive holds the disc 101S having the track pitch Tp of 1.6 $\mu$m, but also when the disc drive holds the disc 101D having the track pitch Tp of 1.07 $\mu$m. Thus, the optical disc drive 100 can record data on and reproduced data from two kinds of optical discs, one having a track pitch Tp of 1.6. $\mu$m and the other having a track pitch Tp of 1.07 $\mu$m.

In the embodiment described above, a tracking error signal STE is generated by the DPP method. Nonetheless, the present invention can be applied to an optical disc drive that performs the three-spot method to generate a tracking error signal STE.

Figure 16:
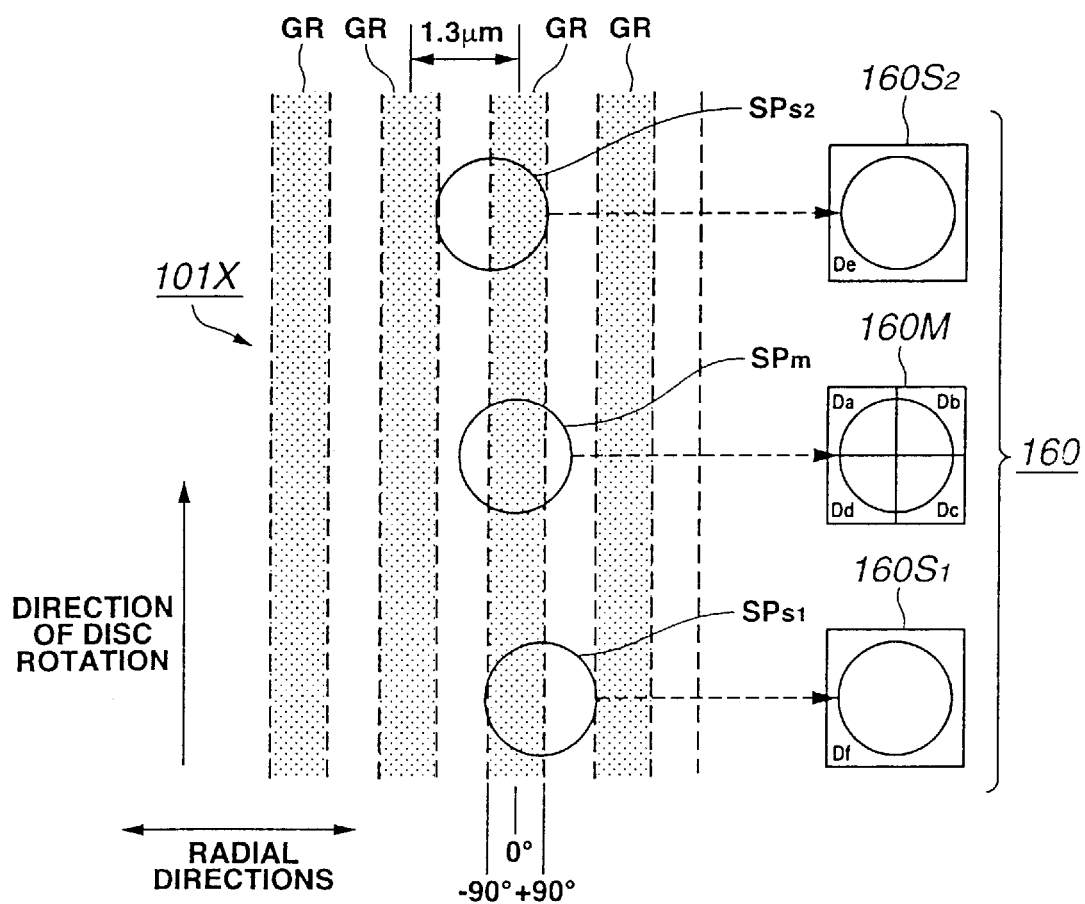
FIG. 16 is a diagram depicting the positional relation between beam spots on a disc and beam spots on a photodetector, illustrating how a tracking error signal is generated in the three-spot method.

An optical pickup of the same structure as the optical pickup 103 of FIG. 12 is employed to generate a tracking error signal STE by means of the thee-spot method. As shown in FIG. 16, a main beam BM and two side beams Bs1 and Bs2 form three spots SPm, SPs1 and SPs2 on the recording surface of an optical disc 101.

As indicated above, the three-spot method is used to generate tracking error signals STE and the disc drive records data on and reproduces data from two types of discs 101S and 101D that have a track pitch Tp of 1.6 $\mu$m and a track pitch Tp of 1.07 $\mu$m, respectively. Therefore, the side spots SPs1 and SPs2 are spaced from the main spot SPm in the opposite radial directions by a distance shorter than 1.6/4 $\mu$m and longer than 1.07/4 $\mu$m.

The tracking error signal STE generated by the three-spot method has the maximum amplitude when the disc drive holds the disc 101S having a track pitch Tp of 1.6 $\mu$m, if the side spots SPs1 and SPs2 are spaced from the main spot SPm in the opposite radial directions by a distance shorter than 1.6/4 $\mu$m. If the side spots SPs1 and SPs2 are spaced from the main spot SPm in the opposite radial directions by a distance shorter than 1.07/4 $\mu$m, the tracking error signal STE generated by the three-spot method has the maximum amplitude when the disc drive holds the disc 101D having a track pitch Tp of 1.07 $\mu$m.

The side spots SPs1 and SPs2 may be formed on the assumption that the disc drive holds a disc 101X having a track pitch Tp of 1.3 $\mu$m. That is, the side spots SPs1 and SPs2 are spaced from the main spot SPm in the opposite radial directions by a distance shorter than 1.3/4 $\mu$m. If so, the positions of the side spots SPs1 and SPs2 can be adjusted by changing the angle of the grating 154.

As shown in FIG. 16, the photodetector 160 comprises one four-segment photodiode section 160M and two photodiode sections 160S1 and 160S2. Three spots SPm', SPs1' and SPs2' are formed on the photodiode sections 160M, 160S1 and 160S2 that constitute the photodetector 160, respectively, as three laser beam are reflected from the spots SPm, SPs1 and SPs2 formed on by the disc 101.

The RF amplifier 105 (see FIG. 11) reproduces an RF signal SRF and generates a focusing error signal SFE by performing the following operations:

$SRF=(Sa+Sb+Sc+Sd)$ $SFE=(Sa+Sc)-(Sb+Sd)$ where Sa, Sb, Sc and Sd are signals output from the four photodiodes Da to Dd constituting the photodiode section 160M, Sf is the signal output from the photodiode Df constituting the photodiode section 160S1, and Se is the signal output from the photodiode De constituting the photodiode section 160S2.

The RF amplifier 105 subtracts the sum of signals Sb and Sc from the sum of signals Sa and Sd, thus generating a push-pull signal Sppm that corresponds to the light reflected from the main spot SPm. A high-pass filter extracts a wobble signal SWB from the push-pull signal Sppm thus generated.

Figure 4:
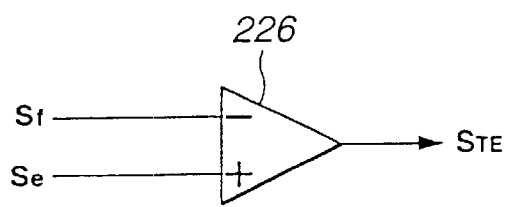
FIG. 4 is a diagram illustrating a circuit connection for generating a tracking error signal in the three-spot method.

In the RF amplifier 105, the circuit shown in FIG. 4 generates a tracking error signal STE by the three-spot method. More precisely, the subtracter 226 subtracts the signal Sf from the signal Se, generating a tracking error signal STE.

Figure 17A:
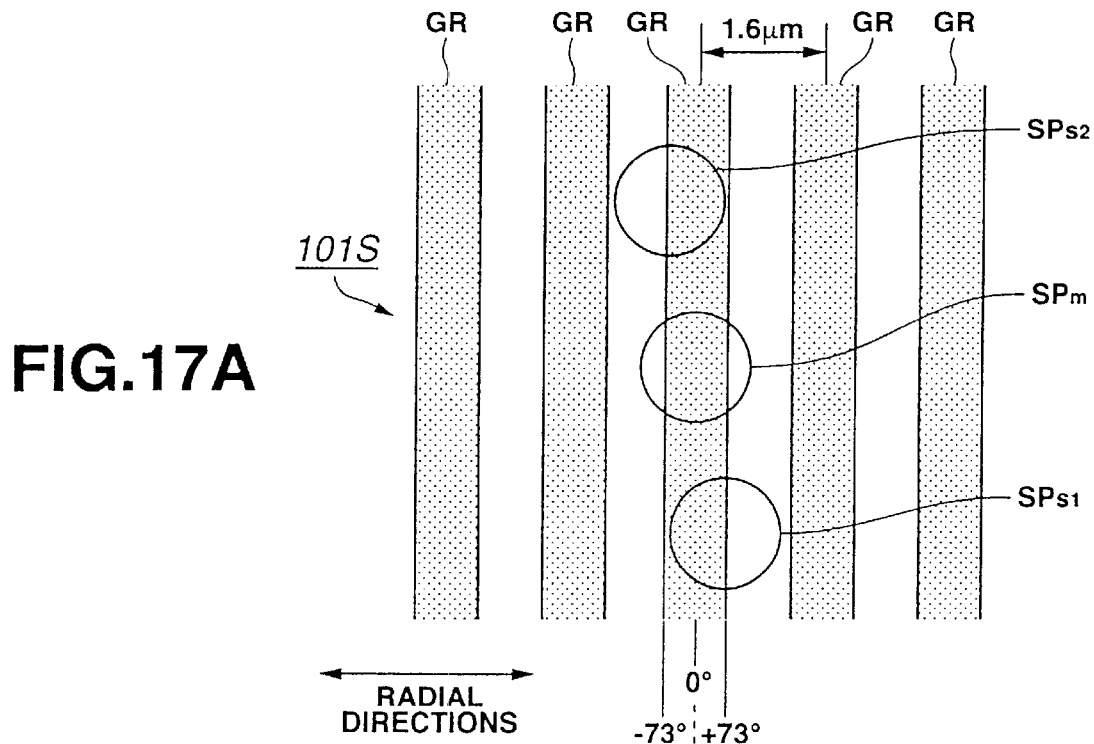
FIG. 17A is a diagram showing the positional relation that the beam spots on a disc having a track pitch Tp of 1.6 μm have to generate a tracking error signal STE in the three-spot method (side spots are spaced by distance of 1.3 μm)

Assume that the disc drive holds a disc 101S that has a track pitch Tp of 1.6 $\mu$m. In this case, the side spots SPs1 and SPs2 are spaced from the main spot SPm in the opposite radial directions by a distance of 1.3/4 $\mu$m (73°) as is shown in FIG. 17A. Hence, the main signal Sm (the sum of signals Sa and Sd), the signal Se and the signal Sf change as is illustrated in FIGS. 17B, 17C and 17D with respect to the position the main spot SPm takes in the radial direction. Thus, the signals Se and Sf are almost in the opposite phases.

The tracking error signal STE therefore has sufficient amplitude, as seen from FIG. 17E.

Assume that the disc drive holds a disc 101D that has a track pitch Tp of 1.07 μm. In this case, the side spots SPs1 and SPs2 are spaced from the main spot SPm in the opposite radial directions by a distance of 1.3/4 μm (109°) as is shown in FIG. 18A. The main signal Sm, the signal Se and the signal Sf therefore change as is shown in FIGS. 18B, 18C and 18D with respect to the position the main spot SPm takes in the radial direction. Thus, the signals Se and Sf are almost in the opposite phases. The tracking error signal STE therefore has sufficient amplitude, as seen from FIG. 18E.

The tracking error signal STE has an amplitude while the disc drive holds the disc 101S that has the track pitch Tp of 1.6 μm, and a different amplitude while the disc drive holds the disc 101D that has the track pitch Tp of 1.07 μm. Whichever disc the disc drive holds, it is required that the tracking error signal STE should have the same amplitude. To this end, the gain of the subtracter 226 or the like, used in the circuit of FIG. 4, may be controlled in accordance with the track pitch of the optical disc.

In this embodiment, the side spots SPs1 and SPs2 are spaced from the main spot SPm in the opposite radial directions by a distance shorter than 1.6/4 μm and longer than 1.07/4 μm, as has been pointed out. Hence, a tracking error signals STE having an adequate amplitude can be obtained by the three-spot method, not only when the disc drive holds the disc 101S having the track pitch Tp of 1.6 μm, but also when the disc drive holds the disc 101D having the track pitch Tp of 1.07 μm. The optical disc drive can therefor record data on and reproduced data from two kinds of optical discs, one having a track pitch Tp of 1.6 μm and the other having a track pitch Tp of 1.07 μm.

The embodiments described above are designed to record data on and reproduce data from two types of discs, one having a track pitch Tp of 1.6 μm and the other having a track pitch Tp of 1.07 μm. Nevertheless, the present invention can be applied to a disc drive that record data on and reproduced data from more types of discs 101. In this disc drive, each side spot (SPs1 or SPs2) need only to assume a position between two positions, which the side spot may take to generate a tracking error signal of a maximum amplitude when the drive holds the disc having the longest track pitch and a tracking error signal of a maximum amplitude when the drive holds the disc having the shortest track pitch. It is therefore possible to generate a tracking error signal of sufficient amplitude, regardless of the track pitch of the disc the disc drive hold.

The embodiments described above are designed to record data on and reproduce data from the discs 101S and 101D that have different track pitches. Nonetheless, the present invention can be applied to a disc drive designed to record data and reproduce data from a disc 101W having recording regions that differ in track pitch. The disc 101W may have, for example, an inner recording region having a track pitch Tp of 1.6 μm and an outer recording region having a track pitch Tp of 1.07 μm.

The embodiments of this invention, described above, are optical disc drives 100. The present invention can be applied to an optical disc that can record data on and reproduce data from optical discs of different types, which differ in track pitch, or an optical disc having recording regions that differ in track pitch.

What is claimed is:

1. An optical recording/reproducing apparatus for use in combination with recording media that differ in track pitch, or a recording medium having recording regions that differ in track pitch, said apparatus comprising:

drive means operable with both of a first recording medium and a second recording medium and for rotating both of the first recording medium and the second recording medium at different times, a track pitch of the first recording medium being different than a track pitch of the second recording medium, and a thickness of a substrate of the first recording medium being a same thickness as a thickness of a substrate of the second recording medium;

an optical head for applying light to the first recording medium and the second recording medium being rotated by the drive means at the different times, thereby to record data signals on the recording medium or reproducing data from the recording medium; and a signal-processing circuit for processing a signal detected by the optical head, wherein the optical head comprises a light source for emitting light, an objective lens for condensing the light emitted by the light source on the first recording medium and the second recording medium at the different times and signal-detecting means for receiving the light reflected from the first recording medium and the second recording medium at the different times, thereby to detect signals, and the objective lens has a numerical aperture NA, where 0.5 <NA≦0.6.

2. The apparatus according to claim 1, wherein the light emitted from the light source has a wavelength of about 780 nm.

3. The apparatus according to claim 1, wherein the first recording medium has a track pitch ranging from 1.0 μm to 1.2 μm and the second recording medium has a track pitch of 1.6 μm.

4. The apparatus according to claim 3, wherein the first recording medium has a minimum pit length ranging from 0.555 μm to 0.694 μm, and the drive means rotates the first recording medium and the second recording medium at a linear velocity of 0.8 m/sec to 1.0 m/sec.

5. The apparatus according to claim 1, wherein the numerical aperture NA of the objective lens is 0.55.

6. An optical head apparatus for use in combination with both of a first recording medium and a second recording medium at different times and that differ in track pitch, or a recording medium having recording regions that differ in track pitch, said optical head apparatus comprising:

a light source for emitting light;

an objective lens for condensing the light emitted by the light source on the first recording medium and the second recording medium at the different times; and signal-detecting means for receiving the light reflected from the first recording medium and the second recording medium at the different times, thereby to detect signals, wherein the objective lens has a numerical aperture NA, where 0.5<NA≦0.6 wherein, a track pitch of the first recording medium is different than a track pitch of the second recording medium, and a thickness of a substrate of the first recording medium is a same thickness as a thickness of a substrate of the second recording medium.

7. The optical head apparatus according to claim 6, wherein the light emitted from the light source has a wavelength of about 780 nm.

8. The optical head apparatus according to claim 6, wherein the first recording medium has a track pitch ranging from 1.0 μm to 1.2 μm and the second recording medium has a track pitch of 1.6 μm.

9. The optical head apparatus according to claim 6, wherein the first recording medium has a minimum pit length ranging from 0.555 μm to 0.694 μm and the second recording medium has a minimum pit length of 0.833 μm.

10. The optical head apparatus according to claim 6, wherein the numerical aperture NA of the objective lens is 0.55.

11. An optical disc drive for use in combination with both of a first optical disc and a second optical disc at different times, each having recording tracks and differing in track pitch from any other optical disc, or an optical disc having recording regions, each having recording tracks and differing in track pitch from any other recording region, said optical head drive comprising:

light beam applying means for forming a main spot, a first side spot and a second side spot on the first optical disc and the second optical disc at the different times, said first and second spots spaced apart from the main spot in the opposite radial directions;

error signal generating means for generating a tracking error signal from light reflected from at least the first and second side spots, said tracking error signal representing a distance by which the main spot deviates from any recording track in the radial direction; and tracking control means for controlling the light beam applying means in accordance with the tracking error signal, thereby to move the main spot to a predetermined position on the recording track, wherein the light beam applying means forms the first and second side spots, each between a first position and a second position, said first position being one each side spot takes to generate a tracking error signal of a maximum amplitude when the first optical disc is in use, and said second position being one each side spot takes to generate a tracking error signal of a maximum amplitude when the second optical disc is in use, wherein, a track pitch of the first optical disc is longer than a track pitch of the second optical disc, and a thickness of a substrate of the first optical disc is a same thickness as a thickness of a substrate of the second optical disc.

12. The optical disc drive according to claim 11, further comprising gain control means for controlling a gain of the error signal generating means, thereby causing the error signal generating means to generate a tracking error signal that has the same amplitude for different track pitches.

13. The optical disc drive according to claim 11, wherein the error signal generating means generates the tracking error signal by subtracting two push-pull signals obtained from two light beams reflected from the first and second side spots, from a push-pull signal that has been obtained by detecting light reflected from the main spot.

14. The optical disc drive according to claim 13, wherein the light beam applying means form the first and second side spots, which are spaced from the main spot in the opposite radial directions by a distance shorter than half the longest track pitch and longer than half the shortest track pitch.

15. The optical disc drive according to claim 11, wherein the error signal generating means generates the tracking error signal by subtracting a signal representing the light reflected from the second side spot, from a signal representing the light reflected from the first side spot.

16. The optical disc drive according to claim 11, wherein the light beam applying means form the first and second side spots, which are spaced from the main spot in the opposite radial directions by a distance shorter than a quarter of the longest track pitch and longer than a quarter of the shortest track pitch.

17. The optical disc drive according to claim 11, wherein the light beam applying means comprises an objective lens that has a numerical aperture NA, where $0.5 > NA \leq 0.6$.

18. An optical head apparatus for use in combination with both of a first optical disc and a second optical disc at different times and that differ in track pitch, or an optical disc having recording regions that differ in track pitch, said optical head apparatus comprising:

a light source for emitting light;

a diffraction grating for splitting the light emitted from the light source, thereby to form a main spot, a first side spot and a second side spot on the optical disc, said first and second spots spaced apart from the main spot in the opposite radial directions;

an objective lens for condensing the light split by the diffraction grating, on the first optical disc and the second optical disc at the different times; and a light-receiving device for receiving returning light reflected from the first optical disc and the second optical disc at the different times, wherein the light beam applying means forms the first and second side spots, each between a first position and a second position, said first position being one each side spot takes to generate a tracking error signal of a maximum amplitude when the first optical disc is in use, and said second position being one each side spot takes to generate a tracking error signal of a maximum amplitude when the second optical disc is in use, wherein, a track pitch of the first optical disc is longer than a track pitch of the second optical disc, and a thickness of a substrate of the first optical disc is a same thickness as a thickness of a substrate of the second optical disc.

19. The optical head apparatus according to claim 18, further comprising error signal generating means for generating a tracking error signal from the light received by the light-receiving means and gain control means for controlling a gain of the error signal generating means, thereby causing the error signal generating means to generate a tracking error signal that has the same amplitude for different track pitches.

20. The optical head apparatus according to claim 18, further comprising error signal generating means for generating a tracking error signal from the light received by the light-receiving means, by subtracting two push-pull signals obtained from two light beams reflected from the first and second side spots, from a push-pull signal that has been obtained by detecting light reflected from the main spot.

21. The optical head apparatus according to claim 18, wherein the first and second side spots are spaced from the main spot in the opposite radial directions by a distance shorter than half the longest track pitch and longer than half the shortest track pitch.

22. The optical head apparatus according to claim 18, further comprising error generating means for generating a tracking error signal from the light received by the light-receiving means, by subtracting a signal obtained from the light beam reflected from the second side spot, from a signal obtained from the light beam reflected from the first side spot.

23. The optical head apparatus according to claim 18, wherein the first and second side spots are spaced from the main spot in the opposite radial directions by a distance shorter than a quarter of the longest track pitch and longer than a quarter of the shortest track pitch.

24. The optical head apparatus according to claim 18, wherein the objective lens has a numerical aperture NA, where $0.5 < NA \leq 0.6$.

25. A tracking control method used in an optical disc drive for using both of a first optical disc and a second optical disc at different times each having recording tracks and differing in track pitch from any other optical disc, or an optical disc having recording regions, each having recording tracks and differing in track pitch from any other recording region, said method comprising the steps of:

forming a main spot, a first side spot and a second side spot on the first optical disc and the second optical disc at the different times, said first and second spots spaced apart from the main spot in the opposite radial directions;

generating a tracking error signal from light reflected from at least the first and second side spots, said tracking error signal representing a distance by which the main spot deviates from any recording track in the radial direction; and controlling the light beam applying means in accordance with the tracking error signal, thereby to move the main spot to a predetermined position on the recording track, wherein the light beam applying means forms the first and second side spots, each between a first position and a second position, said first position being one each side spot takes to generate a tracking error signal of a maximum amplitude when the first optical disc is in use, and said second position being one each side spot takes to generate a tracking error signal of a maximum amplitude when the second optical disc is in use, wherein, a track pitch of the first optical disc is longer than a track pitch of the second optical disc, and a thickness of a substrate of the first optical disc is a same thickness as a thickness of a substrate of the second optical disc.

26. The optical disc according to claim 25, wherein a first recording region has recording tracks formed at a track pitch of 1.6 μm and a second recording region has recording tracks formed at a track pitch ranging from 1.00 μm to 1.20 μm.

* * * * *

UNITED STATES PATENT AND TRADEMARK OFFICE
CERTIFICATE OF CORRECTION

PATENT NO.   : 6,757,227 B2
DATED        : June 29, 2004
INVENTOR(S)  : Eiji Kumagai et al.

It is certified that error appears in the above-identified patent and that said Letters Patent is hereby corrected as shown below:

Column 4,
Line 9, delete second "signals",
Line 47, change "generates" to -- generate --.

Column 10,
Line 49, change "functions" to -- function --.

Column 15,
Line 39, change "sown" to -- shown --,
Line 66, change "beam" to -- beams --.

Column 17,
Line 66, change "thee-spot" to -- three-spot --.

Column 18,
Line 34, change "beam" to -- beams --.

Column 19,
Line 47, after "disc" delete "the disc"

Signed and Sealed this

Twenty-eighth Day of December, 2004

JON W. DUDAS
*Director of the United States Patent and Trademark Office*